United States Patent [19]
Morooka et al.

[11] Patent Number: 5,257,129
[45] Date of Patent: Oct. 26, 1993

[54] REAL IMAGE TYPE VARIABLE MAGNIFICATION VIEWFINDER OPTICAL SYSTEM

[75] Inventors: Masaru Morooka, Hachiouji; Shinichi Yoshii, Urawa, both of Japan

[73] Assignee: Olympus Optical Co., Ltd., Tokyo, Japan

[21] Appl. No.: 823,472

[22] Filed: Jan. 22, 1992

[30] Foreign Application Priority Data

| Jan. 22, 1991 | [JP] | Japan | 3-021630 |
| Jul. 31, 1991 | [JP] | Japan | 3-191911 |
| Oct. 2, 1991 | [JP] | Japan | 3-255410 |

[51] Int. Cl.$^5$ .................. G02B 15/14; G02B 23/00; G02B 9/34
[52] U.S. Cl. ................... 359/432; 359/676; 359/783
[58] Field of Search ........... 359/422, 432, 380, 676, 359/680, 682, 783

[56] References Cited

U.S. PATENT DOCUMENTS

| 3,088,368 | 5/1963 | Tripp et al. | 359/432 |
| 3,438,689 | 4/1969 | Wehr | 359/432 |
| 4,842,395 | 6/1989 | Sato et al. | |
| 4,906,078 | 3/1990 | Inabata et al. | |
| 5,144,480 | 9/1992 | Ohshita | 359/432 |

FOREIGN PATENT DOCUMENTS

| 61-156018 | 7/1986 | Japan . |
| 64-65519 | 3/1989 | Japan . |
| 1-131510 | 5/1989 | Japan . |
| 1-257817 | 10/1989 | Japan . |

*Primary Examiner*—Bruce Y. Arnold
*Assistant Examiner*—Evelyn A. Lester
*Attorney, Agent, or Firm*—Cushman, Darby & Cushman

[57] ABSTRACT

A real image type variable magnification viewfinder optical system comprising, in order from the object side, an objective lens system having positive refractive power and an eyepiece lens system having positive refractive power. The objective lens system comprises, in order from the object side, a first lens unit having negative refractive power, a second lens unit having positive refractive power, a third lens unit having positive refractive power and a fourth lens unit having positive refractive power. The second lens unit and the third lens unit are moved, with the first lens unit kept fixed, for performing variation of magnification and adjustment of diopter. This viewfinder optical system can have a high magnification and a large field angle of emergence at a low magnification position thereof, a variable magnification ratio of 2 or higher and favorably corrected aberrations, and be manufactured at a low cost.

19 Claims, 30 Drawing Sheets

LOW MAGNIFICATION POSITION

MIDDLE MAGNIFICATION POSITION

HIGH MAGNIFICATION POSITION

LOW MAGNIFICATION POSITION

MIDDLE MAGNIFICATION POSITION

HIGH MAGNIFICATION POSITION

LOW MAGNIFICATION POSITION

MIDDLE MAGNIFICATION POSITION

HIGH MAGNIFICATION POSITION

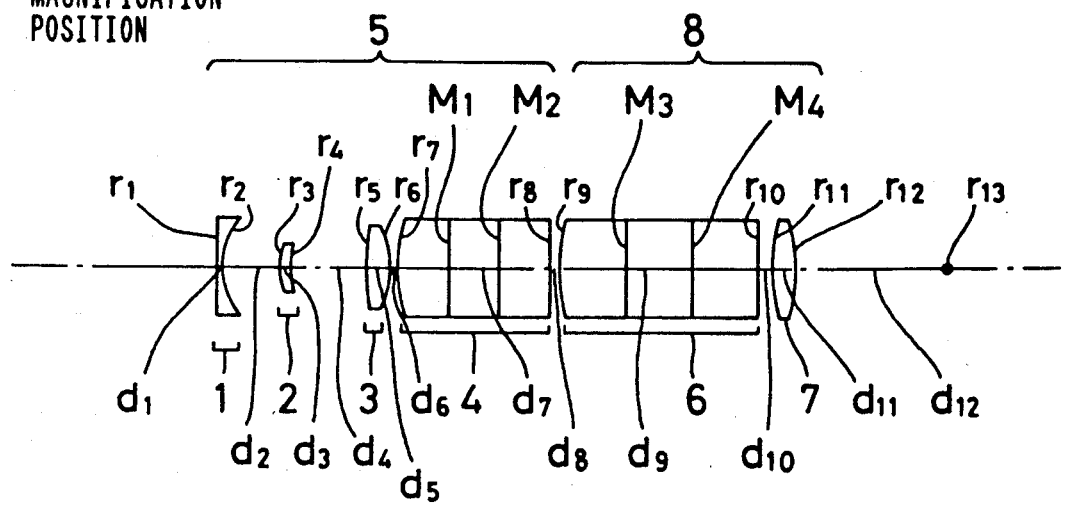
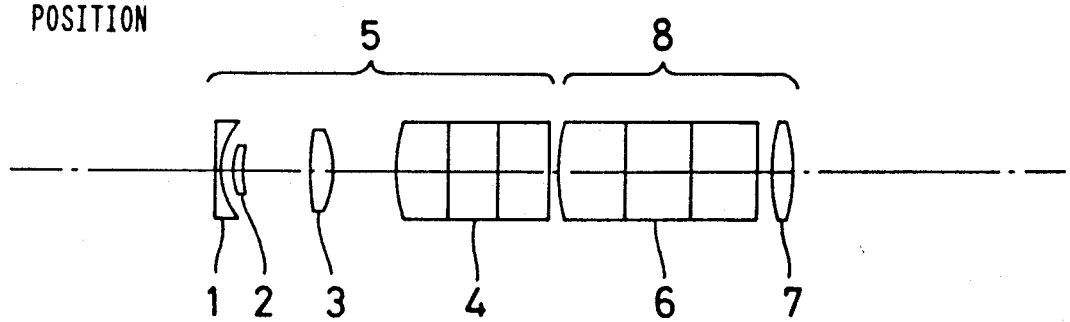
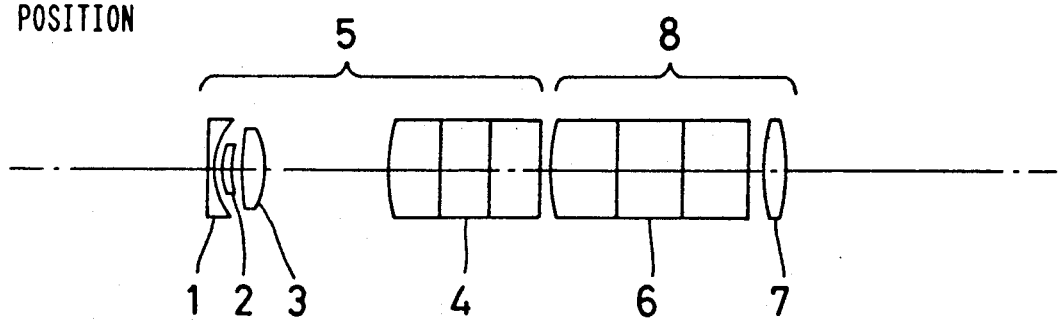

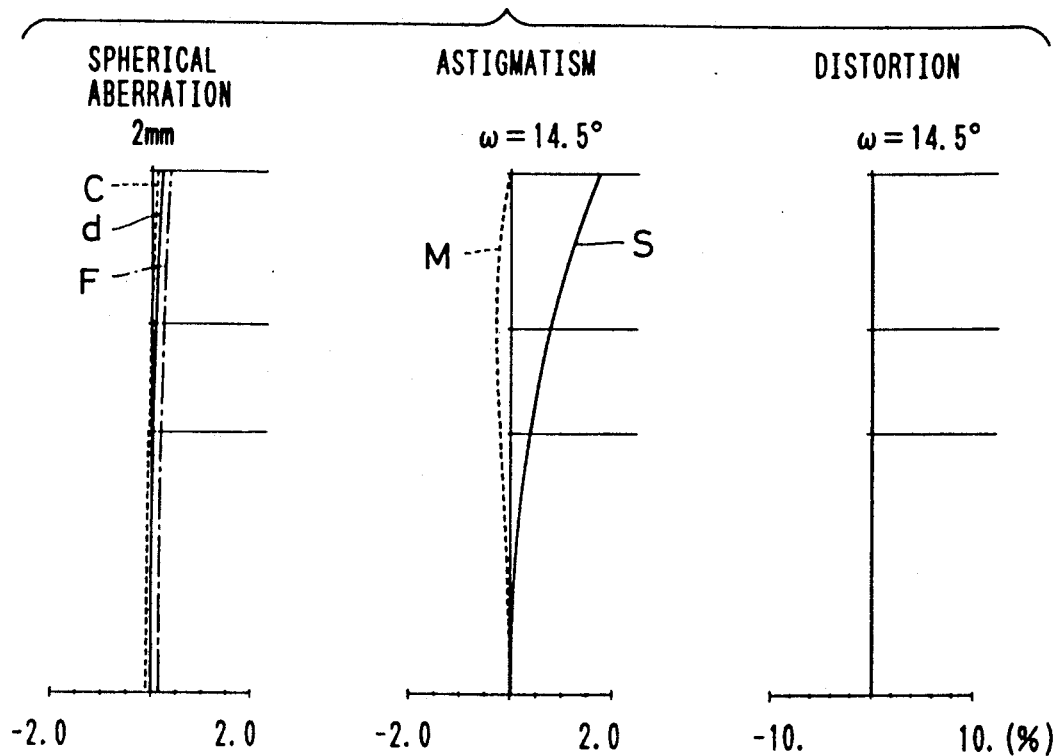
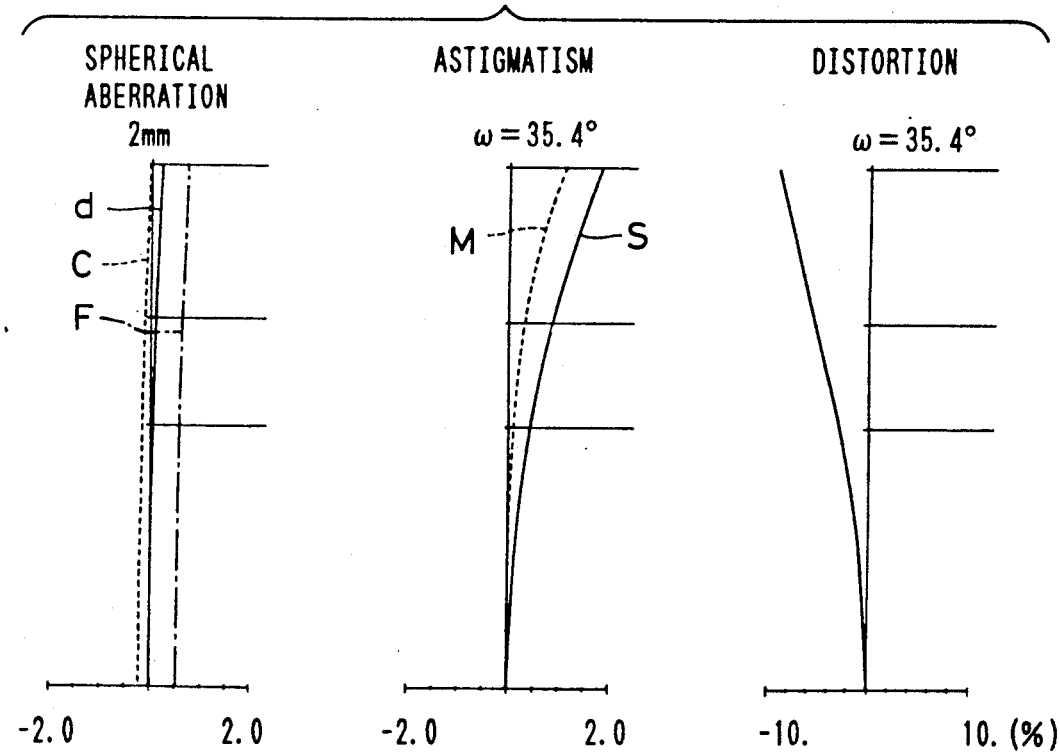

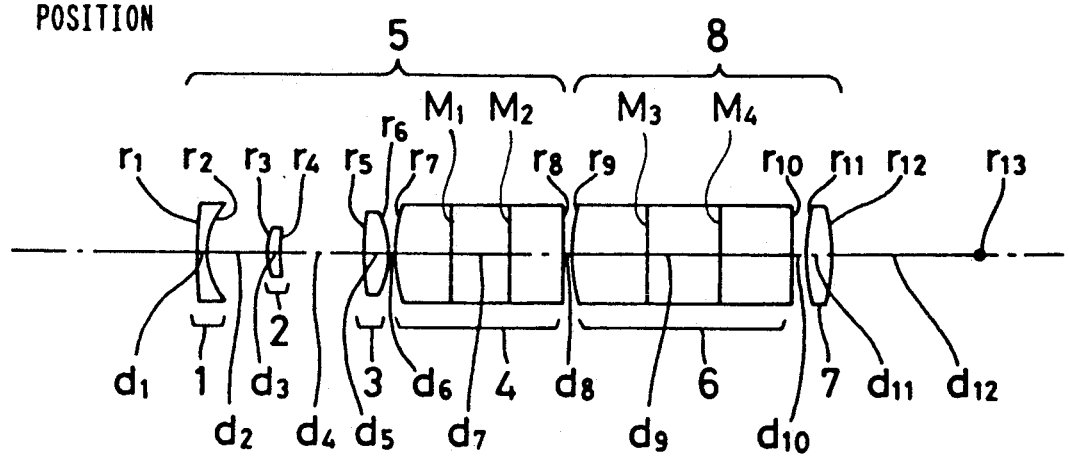
FIG. 23A — LOW MAGNIFICATION POSITION
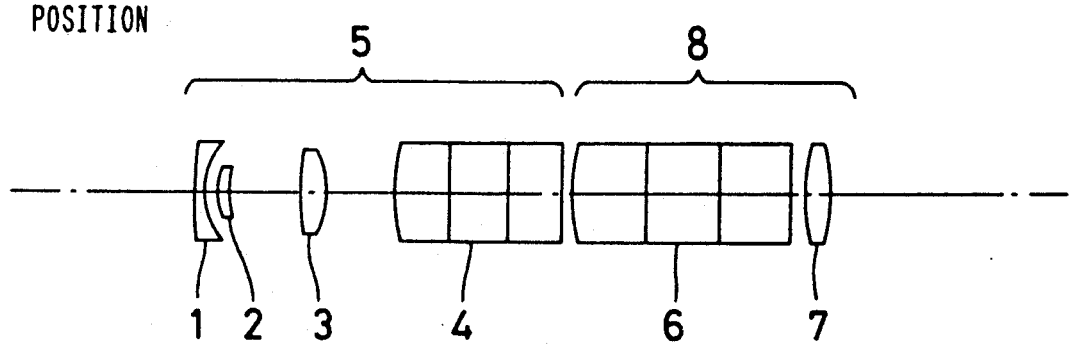
FIG. 23B — MIDDLE MAGNIFICATION POSITION
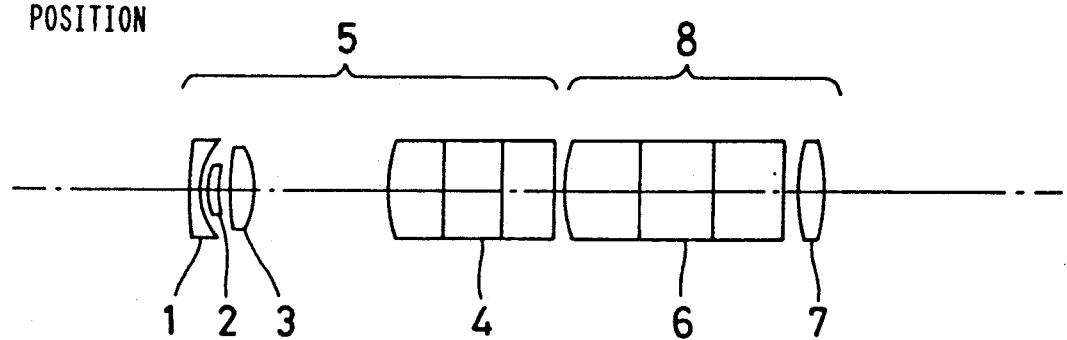
FIG. 23C — HIGH MAGNIFICATION POSITION

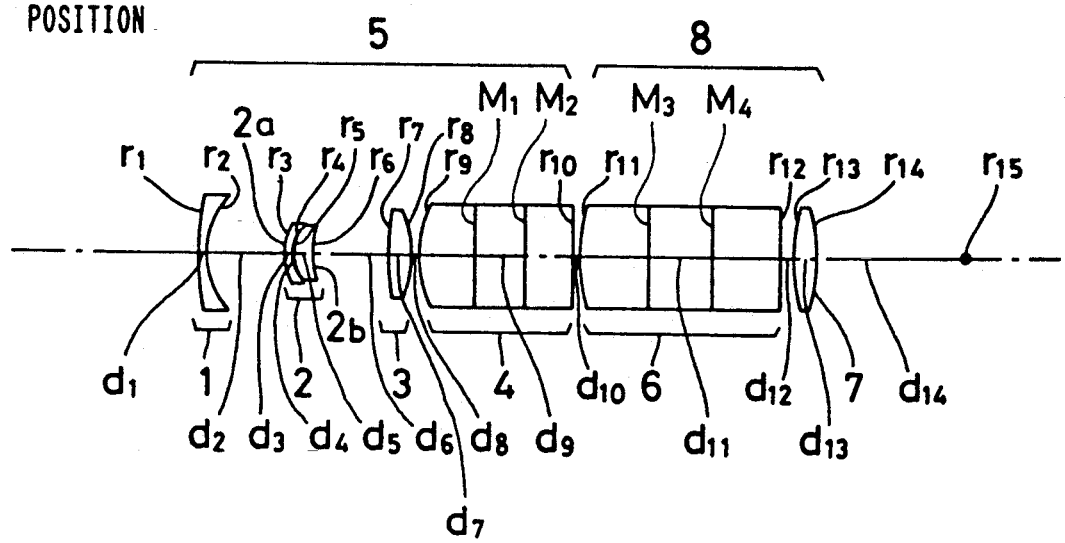
FIG. 27A — LOW MAGNIFICATION POSITION
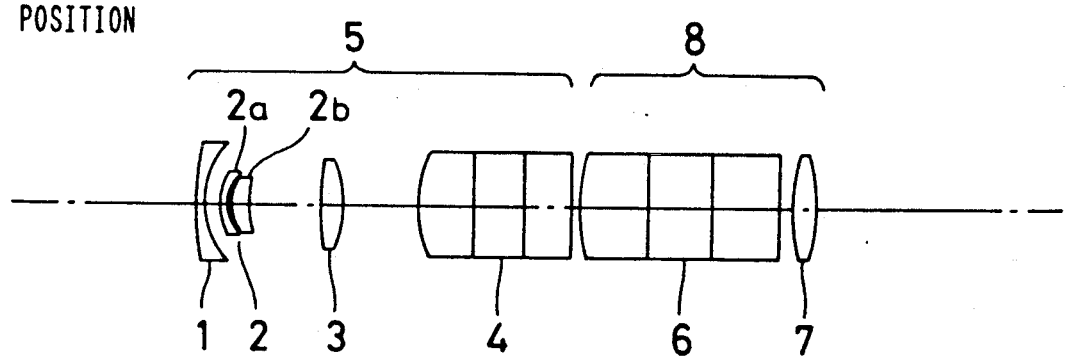
FIG. 27B — MIDDLE MAGNIFICATION POSITION
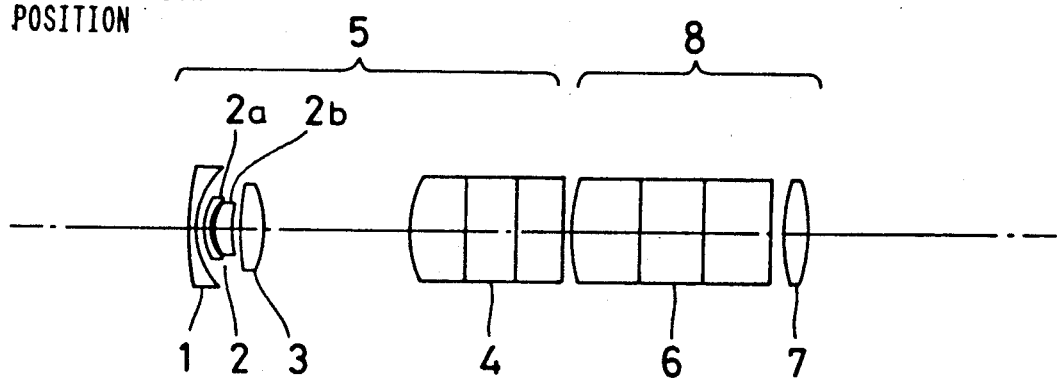
FIG. 27C — HIGH MAGNIFICATION POSITION

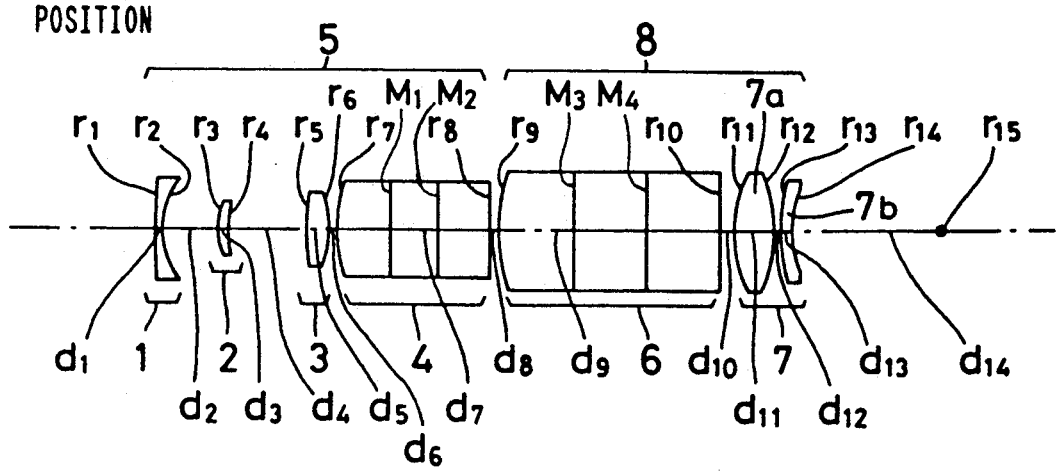
FIG. 31A LOW MAGNIFICATION POSITION
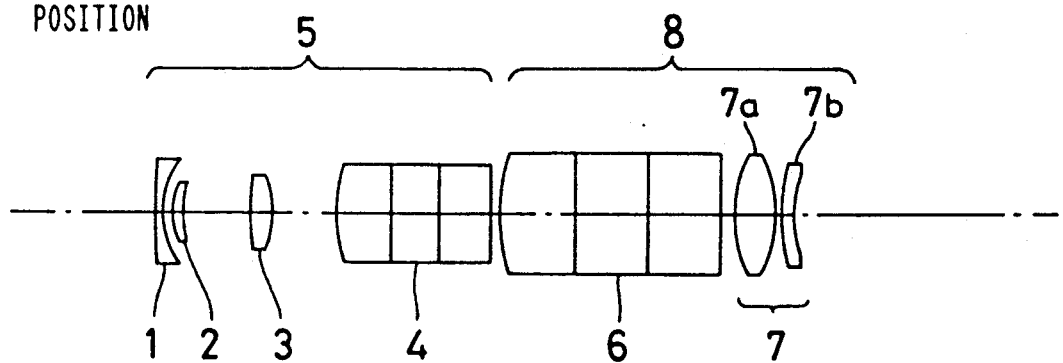
FIG. 31B MIDDLE MAGNIFICATION POSITION
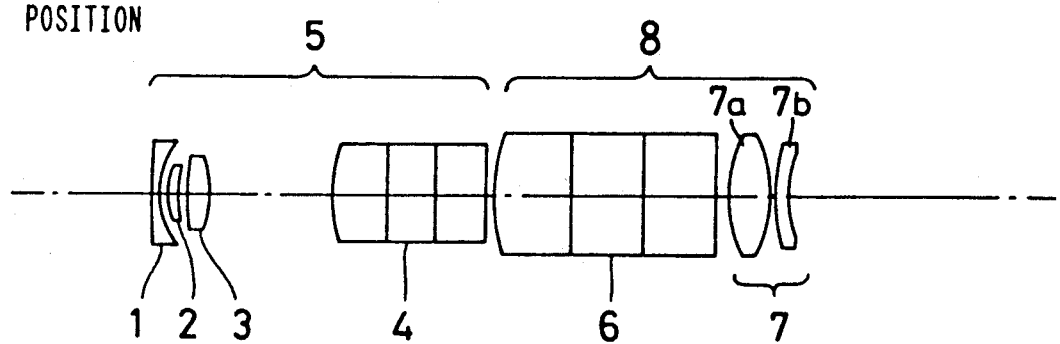
FIG. 31C HIGH MAGNIFICATION POSITION

LOW MAGNIFICATION POSITION

MIDDLE MAGNIFICATION POSITION

HIGH MAGNIFICATION POSITION

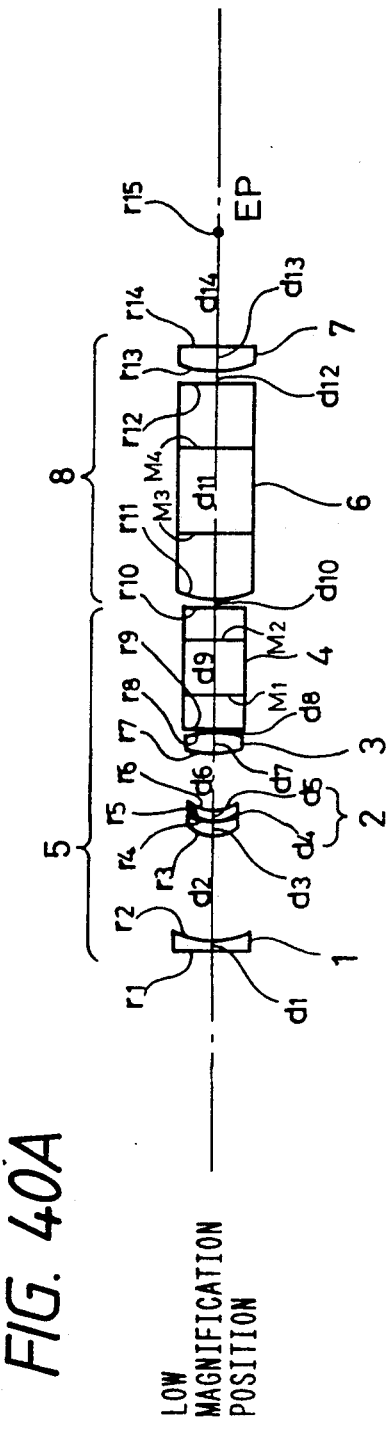
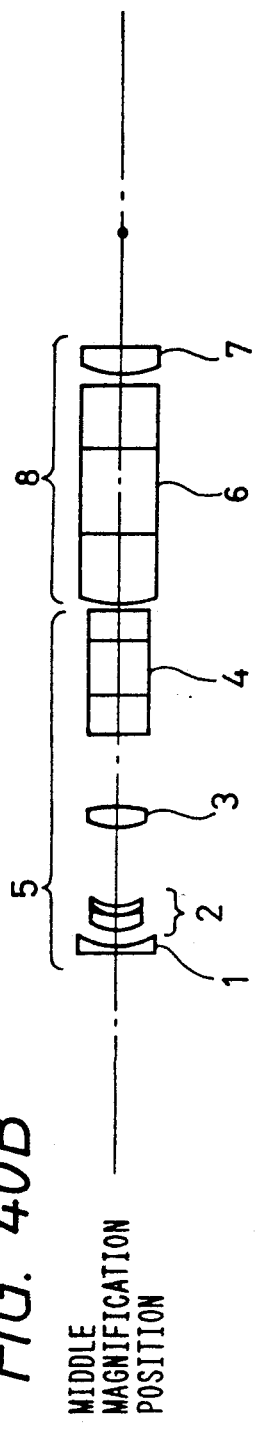
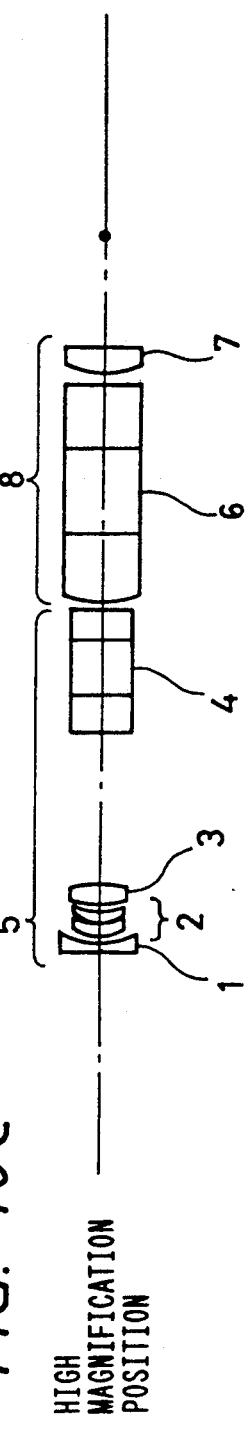
FIG. 40A LOW MAGNIFICATION POSITION
FIG. 40B MIDDLE MAGNIFICATION POSITION
FIG. 40C HIGH MAGNIFICATION POSITION

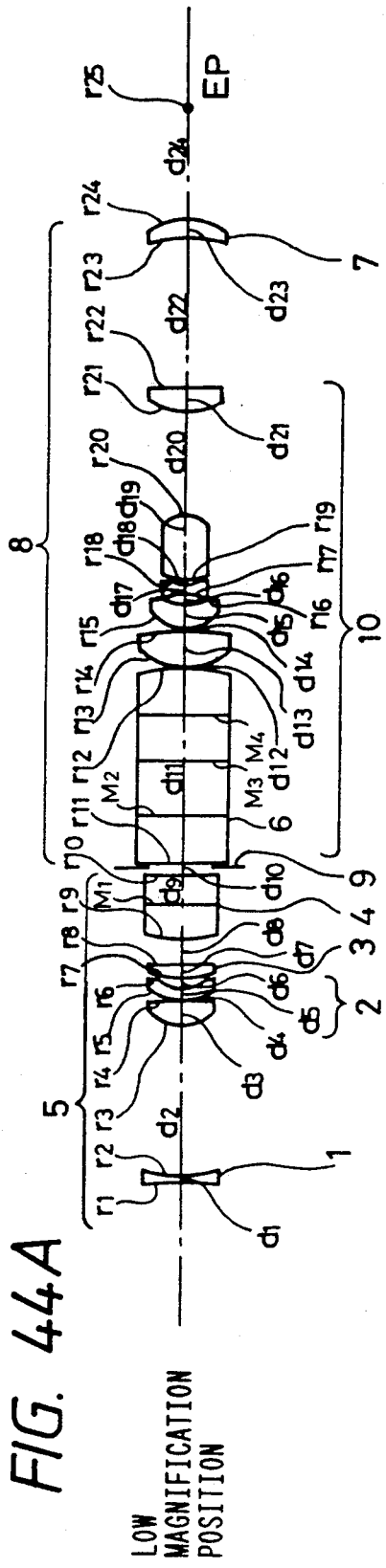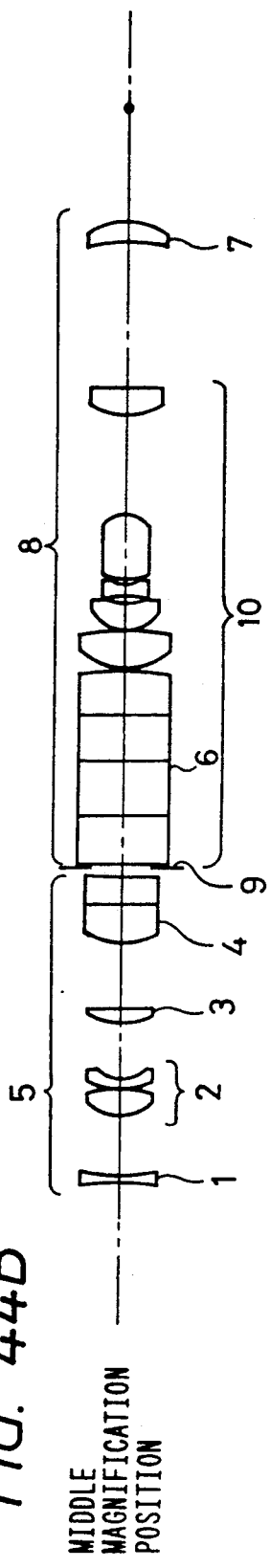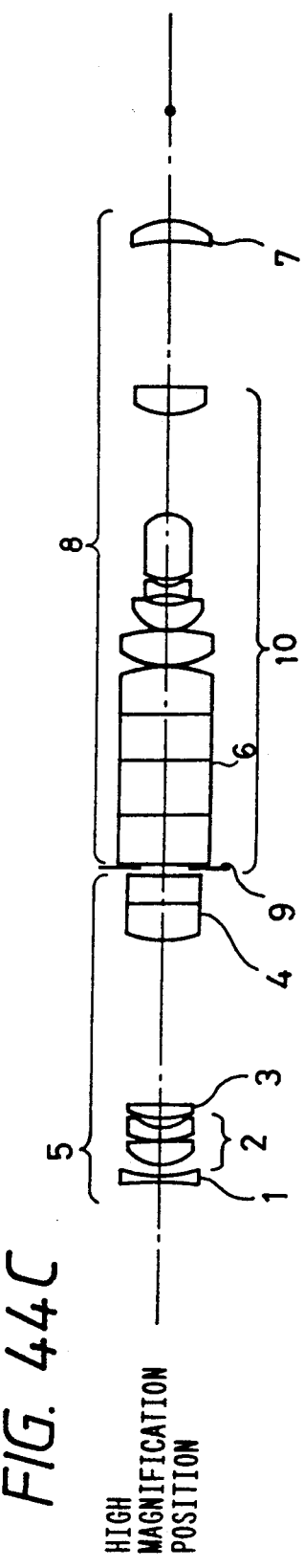
FIG. 44A LOW MAGNIFICATION POSITION
FIG. 44B MIDDLE MAGNIFICATION POSITION
FIG. 44C HIGH MAGNIFICATION POSITION

REAL IMAGE TYPE VARIABLE MAGNIFICATION VIEWFINDER OPTICAL SYSTEM

BACKGROUND OF THE INVENTION a) Field of the Invention:

The present invention relates to a real image type variable magnification viewfinder optical system which is to be used with photographic cameras, video cameras and so on.

b) Description of the Prior Art:

The inverted Galilean viewfinder optical system is known well as a finder optical system which is used separately from a photographing optical system. However, this type of viewfinder optical system has a defect that it does not permit clear observation of a visual field frame or a visual field itself due to ghost and flare produced by a half mirror used for forming the visual field frame.

In contrast, the Keplerian viewfinder optical system, which is configured to permit observing a real image formed by an objective lens system, is almost free from the above-mentioned defect of the Galilean viewfinder optical system and allows clear observation of the visual field frame and the visual field.

As examples of the Keplerian viewfinder optical system having a variable magnification function, there are known two types: one which comprises an objective lens system consisting of two lens units and the other which comprises an objective lens system consisting of three lens units. As the former type of Keplerian viewfinder optical systems, there are known those disclosed by Japanese Patent Preliminary Publication Nos. Sho 61-156018, Sho 64-65519 and Hei 1-257817. Further, known as the latter type is a viewfinder optical system proposed by Japanese Patent Preliminary Publication No. Hei 1-131510.

However, the former type of viewfinder optical systems have a common defect that they have low magnification ratios though these optical systems have relatively long distances as measured from the final surfaces of the objective lens systems to intermediate image surfaces, i.e., long back focal lengths, and total lengths of the optical systems can be shortened by folding back optical paths therein with first reflecting surfaces for erecting images arranged within the distances.

On the other hand, the latter type of viewfinder optical system can easily have a variable magnification ratio of 2 or higher. When attention is paid only to a low magnification position of the latter type of viewfinder optical system, it has a short distance as measured from a first lens unit to a third lens unit and a long back focal length, and it may therefore seem that a total length of the viewfinder optical system can be shortened by folding back an optical path therein with a first reflecting surface arranged between the third lens unit and the intermediate image surface as in the case of the former type of viewfinder optical system.

However, it is practically impossible to arrange the first reflecting surface between the third lens unit and intermediate image surface since the back focal length of the latter type of viewfinder optical system at a high magnification position thereof is extremely shortened by arranging the first reflecting surface at such a location. It is therefore necessary to arrange the first reflecting surface at a location after the intermediate image surface. Consequently, the latter type of the viewfinder optical system has a defect that it cannot have a shortened back focal length.

SUMMARY OF THE INVENTION

In view of the problems described above, it is a primary object of the present invention to provide a real image type variable magnification viewfinder optical system which has a high magnification and a large field angle of emergence at the low magnification position thereof, has a variable magnification ratio of at least 2, is capable of correcting aberrations favorably and can be manufactured at a low cost.

According to the present invention, this object can be attained by including within a viewfinder optical system an objective lens system having positive refractive power and an eyepiece lens system having positive refractive power in order from the object side, including within the objective lens system, in order from the object side, a first lens unit having negative refractive power, a second lens unit having positive refractive power, a third lens unit having positive refractive power and a fourth lens unit including at least one reflecting surface and having positive refractive power, and configuring the optical system to perform variation of magnification and adjustment of diopter by moving the second lens unit and the third lens unit along the optical axis with the first lens unit kept fixed.

In a favorable formation of the present invention, the fourth lens unit is kept fixed together with the first lens unit.

This formation is schematically shown in FIG. 1, wherein the reference symbol $C_1$ represents the first lens unit, the reference symbol $C_2$ designates the second lens unit, the reference symbol $C_3$ denotes the third lens unit, the reference symbol $C_4$ represents the fourth lens unit, which is, for example, a prism having at least one reflecting surface for erecting an image and positive refractive power, the reference symbol $G_1$ designates the objective lens system, the reference symbol P denotes a porro prism, the reference symbol E represents an eyepiece lens unit, the reference symbol $G_{11}$ designates the eyepiece lens system, the reference symbol O denotes a location of an object, the reference symbol I represents a location of an intermediate image surface and the reference symbol EP designates an eye point.

When the second lens unit $C_2$ and the third lens unit $C_3$ are moved for varying magnification in FIG. 1 until a total magnification $\beta23$ of these lens units has a value of $|\beta23|=1$, the intermediate image surface I is shifted for a longest distance toward the object side, i.e. closest to the third lens unit $C_3$. Therefore, correction to maintain the intermediate image surface I substantially at a constant location will reserve a widest space between the second lens unit $C_2$ and the third lens unit $C_3$. Consequently, a variation of magnification within a range of $|\beta23|\leq1$ will make the space reserved between the second lens unit $C_2$ and the third lens unit $C_3$ widest at the high magnification position, whereas a variation of magnification within another range of $|\beta23|>1$ will make the space reserved between the second lens unit $C_2$ and the third lens unit $C_3$ widest at the low magnification position. Further, when magnification of the viewfinder optical system is varied within a range covering both the sides of $|\beta23|=1$, the second lens unit $C_2$ and the third lens unit $C_3$ are moved along the optical axis so as to reserve a widest space therebetween at a position between the low magnification position and the high magnification position.

Furthermore, in order to locate the intermediate image surface within the porro prism, the objective lens system must have a long back focal length. For this purpose, it is desirable to set $|\beta 23|=1$ at a position between the low magnification position and the high magnification position or within the range of $|\beta 23| \geq 1$. In the viewfinder optical system according to the present invention, correction of aberrations produced on an intermediate image formed by the objective lens system $G_1$ is facilitated by sharing the positive refractive power of the second lens unit $C_2$ and the third lens unit $C_3$ with the fourth lens unit $C_4$. Speaking concretely, since a light bundle emerging from the first lens unit $C_1$ is divergent, a wider space reserved between the first lens unit $C_1$ and the second lens unit $C_2$ makes the light bundle more divergent, thereby making it more difficult to obtain a high variable magnification ratio, but the positive refractive power shared with the fourth lens unit $C_4$ functions to progressively converge the divergent light bundle, thereby making it possible to correct the aberrations favorably within a broad magnification range from the high magnification position to the low magnification position.

Moreover, when a distance between a negative lens unit $C_N$ and a positive lens unit $C_P$ is kept constant for preventing a total length of an objective lens system from being prolonged and a back focal length L is also kept fixed for setting an intermediate image surface $I_{AB}$ after a first reflecting surface as shown in FIG. 2 in a retrofocus type objective lens system comprising a lens unit having negative refractive power and a lens unit having positive refractive power in order from the object side, like the objective lens system of the viewfinder optical system according to the present invention, it is undesirable to shorten a total focal length of the two lens units ($f_A \rightarrow f_B$ in FIG. 2) since such shortening of the total focal length inevitably strengthen the refractive power of these lens units and, thereby producing an effect undesirable for correction of aberrations and making it difficult to obtain a large field angle of incidence. In FIG. 2, the reference symbols $O_A$ and $O_B$ represent locations of objects.

In the viewfinder optical system according to the present invention, positive refractive power is imparted to the fourth lens unit $C_4$ so that the aberrations produced by the first lens unit $C_1$ is corrected with three members of the second lens unit $C_2$, the third lens unit $C_3$ and the fourth lens unit $C_4$, whereby the aberrations can be corrected favorably even when the viewfinder optical system has a large field angle at the low magnification position. Further, it is preferable, for obtaining good balance between astigmatism and coma while reducing distortion at both the low magnification position and the high magnification position, to use at least one aspherical surface on each of the first lens unit $C_1$, the second lens unit $C_2$, the third lens unit $C_3$ and the fourth lens unit $C_4$.

In addition, the fourth lens unit $C_4$ adopted for the viewfinder optical system according to the present invention has a first surface functioning as a field lens, thereby making it possible to omit a conventional field lens, reduce manufacturing cost for the optical system and further shorten the total length of viewfinders.

It is desirable that the second lens unit $C_2$ of the objective lens system $G_I$ has a focal length $f_2$ satisfying the following condition (1):

$$1.5 < f_2/f_W \quad (1)$$

wherein the reference symbol $f_W$ represents a focal length of the objective lens system $G_I$ at the low magnification position. If the second lens unit $C_2$ has refractive power exceeding the limit defined by this condition, astigmatism and coma will vary remarkably from the low magnification position to the high magnification position, thereby degrading imaging performance of the viewfinder optical system.

Further, the fourth lens unit $C_4$ of the objective lens system $G_I$ should desirably have a focal length $f_4$ satisfying the following condition (2):

$$2.0 < f_4/f_W \quad (2)$$

If the fourth lens unit $C_4$ has refractive power strong enough to exceed the limit defined by the condition mentioned above, astigmatism will be aggravated in the vicinity of the low magnification position and distortion will be varied from the low magnification position to the high magnification position, thereby degrading the imaging performance of the viewfinder optical system.

For shortening the total length of the viewfinder, it is desirable to form the second lens unit $C_2$ to have a meniscus shape convex toward the object side as a whole and a principal point located on the side of the first lens unit $C_1$ because mechanical interference will be caused between lens units adjacent to each other, especially the first lens unit $C_1$ and the second lens unit $C_2$ at the high magnification position by shortening the total length of the objective lens system $G_I$ with the principal point located within the second lens unit $C_2$. In the viewfinder optical system according to the present invention, the principal point of the second lens unit $C_2$ is located on the side of the first lens unit $C_1$ for allowing a shift of the second lens unit $C_2$ toward the eyepiece lens system $G_{II}$, and an airspace sufficient for preventing the mechanical interference is reserved between the first lens unit $C_1$ and the second lens unit $C_2$.

The viewfinder optical system according to the present invention wherein the first lens unit $C_1$ is kept fixed requires no strict manufacturing precision and makes it possible to omit a cover glass plate which is ordinarily used for preventing dust from entering the interior of the optical system, thereby further reducing manufacturing cost and shorten the total length of viewfinders.

In another favorable formation of the present invention, the objective lens system is further equipped with a first reflecting member arranged on the image side of the third lens unit, the eyepiece lens system is further equipped with a second reflecting member; the first reflecting member being fixed together with the first lens unit, each of the first reflecting member and the second reflecting member which is included in an image erecting system having a surface of incidence and two reflecting surfaces having positive refractive power respectively: and the objective lens system is constructed to satisfy the following condition (3):

$$1.0 < |L/f_1| < 3.0 \quad (3)$$

wherein the reference symbol L represents a distance as measured from a first surface of the objective lens system to the intermediate image surface and the reference symbol $f_1$ designates a focal length of the first lens unit.

In this favorable formation, positive refractive power is imparted to the first reflecting member so that the aberrations produced by the first lens unit is corrected by the three members of the second lens unit, the third lens unit and the first reflecting member. This composition makes it possible to obtain a high variable magnification ratio of the viewfinder optical system and correct aberrations favorably over the entire range from the low magnification position to the high magnification position even when a total length of the objective lens system is shortened. For obtaining good balance between astigmatism and coma while reducing distortion at both the low magnification position and the high magnification position, it is desirable to adopt at least one aspherical surface on each of the first lens unit, the second lens unit and the third lens unit.

When positive refractive power is imparted to the surface of incidence of the second reflecting member in the viewfinder optical system according to the present invention, it is possible to correct the aberrations favorably without forming the eyepiece lens unit so as to have a meniscus shape convex toward the object side and set an optical path of the second reflecting member at a required length. This composition allows obtaining a high magnification of the viewfinder optical system even at the low magnification position thereof. Further, the first reflecting member has a first surface which functions as a field lens and makes it unnecessary to use a field lens which is conventionally arranged separately, thereby permitting to reduce manufacturing cost of the viewfinder optical system and shorten the total length of viewfinders for the thickness of the field lens.

If the first lens unit has refractive power strong enough to exceed the upper limit of the condition (3), an advantage for shortening the total length of the objective lens system will be obtained, but variations of astigmatism and coma from the low magnification position to the high magnification position will be remarkably increased, thereby degrading imaging performance of the viewfinder optical system. If the first lens unit has refractive power weak enough to exceed the lower limit of the condition (3), in contrast, it will be difficult to shorten the total length of the objective lens system from the viewpoint of correction of the aberrations and variation especially of distortion from the low magnification position to the high magnification position will be increased, thereby degrading the imaging performance of the viewfinder optical system.

Furthermore, it is preferable that the second lens unit of the objective lens system has a focal length $f_2$ satisfying the following condition (4):

$$1.5 < f_2 < f_W \tag{4}$$

wherein the reference symbol $f_W$ represents a focal length of the objective lens system at the low magnification position.

If the second lens unit has refractive power strong enough to exceed the lower limit of the condition (4), the variations of astigmatism and coma from the low magnification position to the high magnification position will be remarkably increased, thereby degrading the imaging performance of the viewfinder optical system. Moreover, it is desirable that the first reflecting member of the objective lens system has a focal length $f_4$ satisfying the following condition (5):

$$2.0 < f_4 < f_W \tag{5}$$

If the first reflecting member has refractive power strong enough to exceed the lower limit of the condition (5), astigmatism will be aggravated in the vicinity of the low magnification position and variation of distortion from the low magnification position to the high magnification position will be remarkably increased, thereby degrading the imaging performance of the viewfinder optical system.

In addition, the viewfinder optical system according to the present invention in this formation comprises the first lens unit which is fixedly arranged, does not require strict manufacturing precision and allows omission of a cover glass plate which is ordinarily adopted for preventing dust from entering the interior of the optical system, thereby making it possible to reduce further the manufacturing cost and shorten total lengths of viewfinders.

In a further favorable formation of the present invention, at least a reflecting surface for erecting an image is arranged between the third lens unit and the intermediate image surface, the second lens unit and the third lens unit are moved so as to reserve a maximum airspace therebetween in the vicinity of an intermediate field angle, and the first lens unit satisfies the following condition (6):

$$-1.5 < [(\gamma_{11} - \gamma_{10})/(\gamma_{11} + \gamma_{10})]^{-1} < -0.2 \tag{6}$$

wherein the reference symbol $\gamma_{10}$ represents a radius of curvature on an object side surface of the first lens unit and the reference symbol $\gamma_{11}$ designates a radius of curvature on an image side surface of the first lens unit. Further, the second lens unit and the third lens unit satisfy the following conditions (7) and (8) respectively:

$$-0.2 < (\gamma_{21} - \gamma_{20})/(\gamma_{21} + \gamma_{20}) < 0.2 \tag{7}$$

$$0 < (\gamma_{30} - \gamma_{21})/(\gamma_{30} + \gamma_{21}) < 0.6 \tag{8}$$

wherein the reference symbol $\gamma_{20}$ represents a radius of curvature on an object side surface of the second lens unit, the reference symbol $\gamma_{21}$ designates a radius of curvature on an image side surface of the second lens unit and the reference symbol $\gamma_{30}$ denotes a radius of curvature on an object side surface of the third lens unit.

In this formation, both the second lens unit and the third lens unit are moved for performing variation of magnification and adjustment of diopter at the same time. Speaking more concretely, the second lens unit and the third lens unit which have the positive refractive power are moved from the side of the eyepiece lens system toward the object side for varying magnification from the low magnification position (wide position) to the high magnification position (telephoto position). Since the intermediate image surface is deviated (diopter is misadjusted) by the variation of magnification an airspace reserved between the second lens unit and the third lens unit is varied so as to locate the intermediate image surface constant or adjust diopter.

Another object of the present invention is to provide a real image type variable magnification viewfinder optical system which has a variable magnification ratio substantially higher than 3, which permits shortening a total length of a viewfinder, which has favorably corrected aberrations and which can be manufactured at a low cost.

In the viewfinder optical system according to the present invention, the airspace reserved between the second lens unit and the third lens unit is varied to a maximum width at a location between the low magnification position and the high magnification position by setting the total magnification $\beta 23$ of the second lens unit and the third lens unit at the value of $|\beta 23| = 1$ in the vicinity of an intermediate magnification (in the vicinity of an intermediate field angle) so that the airspace reserved between the second lens unit and the third lens unit is narrow enough to obtain a sufficiently long back focal length at the low magnification position and the third lens unit is moved toward the object side from the location thereof at the low magnification position for reserving a sufficiently long back focal length also at the high magnification position, whereby at least the first reflecting member can be arranged between the third lens unit and the intermediate image surface and the total lengths of viewfinders can be shortened.

Further, an erect image of a visual field can be obtained by interposing, between the objective lens system and the eyepiece lens system, an optical member such as a mirror optical system for erecting an image which is formed at an intermediate location after reflection, a porro prism, an image rotator or an optical system for reimaging the intermediate image formed by the objective lens system. Furthermore, it is desirable for shortening the total lengths of viewfinders to form the second lens unit as a whole so as to have a meniscus shape convex toward the object side and a principal point located on the side of the first lens unit.

If the lower limit of the condition (6) is exceeded, astigmatism of higher orders will be varied remarkably. If the upper limit of the condition (6) is exceeded, in contrast, distortion will be remarkable on the negative side at the low magnification position.

Moreover, if the lower limit of the condition (7) is exceeded, distortion will be remarkable on the negative side at the low magnification position. If the upper limit of the condition (7) is exceeded, in contrast, the variation of magnification will cause remarkable variations of spherical aberration and coma, thereby degrading the imaging performance of the viewfinder optical system. If the lower limit of the condition (8) is exceeded, curvature of field will be remarkable on the negative side at the high magnification position. If the upper limit of the condition (8) is exceeded, in contrast, the variation of magnification will cause a remarkable variation of distortion.

In addition, it is preferable to use at least one aspherical surface on the second lens unit and at least one aspherical surface on the third lens unit for balancing astigmatism and coma while reducing distortion at both the low magnification position and the high magnification position.

The viewfinder optical system according to the present invention uses the first lens unit which is kept fixed during the variation of magnification and permits omitting a cover glass plate which is ordinarily adopted for preventing dust from entering the interior of the optical system, thereby making it possible to reduce the cost required for manufacturing the viewfinder optical system and shorten total lengths of the viewfinders.

These and other objects as well as the features and the advantages of the present invention will become apparent from the following detailed description of the preferred embodiments when taken in conjunction with the accompanying drawings.

BRIEF DESCRIPTION OF THE DRAWINGS

FIG. 19A, FIG. 19B and FIG. 19C are expansion plans illustrating a low magnification position, a middle magnification position and a high magnification position respectively of a fifth embodiment of the viewfinder optical system according to the present invention;

FIG. 22 shows graphs visualizing aberration characteristics at the high magnification position of the fifth embodiment;

FIG. 23A, FIG. 23B and FIG. 23C are expansion plans illustrating a low magnification position, a middle magnification position and a high magnification position respectively of a sixth embodiment of the viewfinder optical system according to the present invention;

FIG. 24 shows curves illustrating aberration characteristics at the low magnification position of the sixth embodiment;

FIG. 27A, FIG. 27B and FIG. 27C are expansion plans illustrating a low magnification position, a middle magnification position and a high magnification position respectively of a seventh embodiment of the viewfinder optical system according to the present invention;

FIG. 31A, FIG. 31B and FIG. 31C are expansion plans illustrating a low magnification position, a middle magnification position and a high magnification position respectively of an eighth embodiment of the viewfinder optical system according to the present invention;

FIG. 40A, FIG. 40B and FIG. 40C are expansion plans illustrating a low magnification position, a middle magnification position and a high magnification position of a tenth embodiment of the viewfinder optical system according to the present invention;

FIG. 44A, FIG. 44B and FIG. 44C are expansion plans illustrating a low magnification position, a middle magnification position and a high magnification position of an eleventh embodiment of the viewfinder optical system according to the present invention;

DESCRIPTION OF THE PREFERRED EMBODIMENTS

Now, the present invention will be described in more detail below with reference to the preferred embodiments illustrated in the accompanying drawings.

First Embodiment

Figure 1:
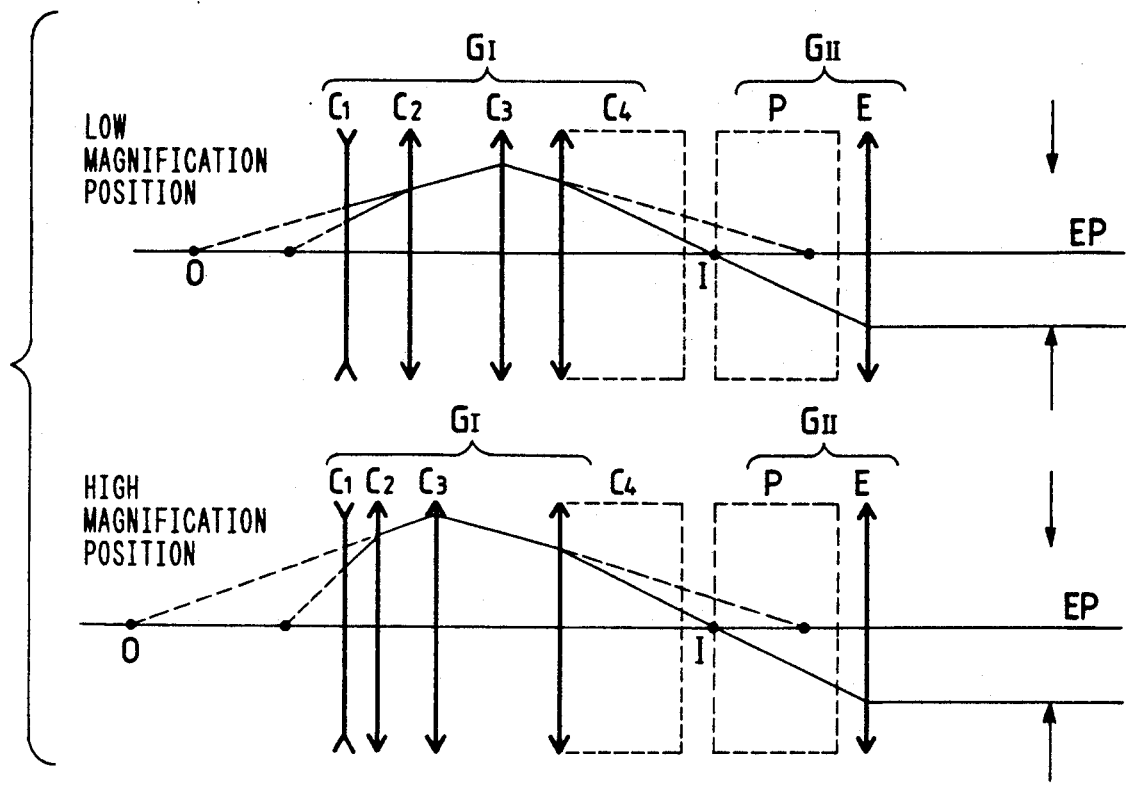
FIG. 1 is a conceptional view illustrating the real image type variable magnification viewfinder optical system according to the present invention.
Figure 2:
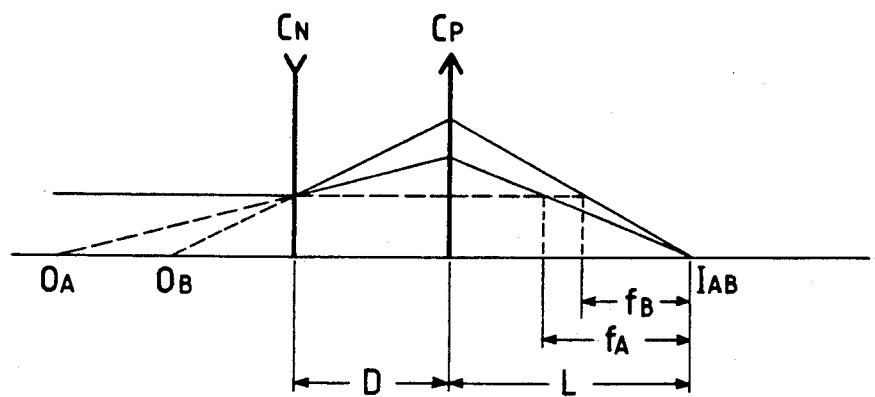
FIG. 2 is a conceptional view illustrating a retrofocus type objective lens system.
Figure 3A:
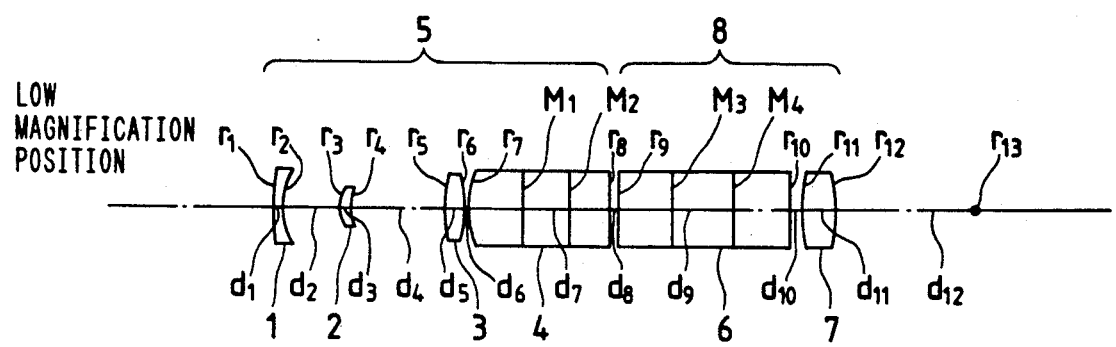
FIG. 3A, FIG. 3B and FIG. 3C are expansion plans illustrating a low magnification position, a middle magnification position and a high magnification position respectively of a first embodiment of the viewfinder optical system according to the present invention.
Figure 3B:
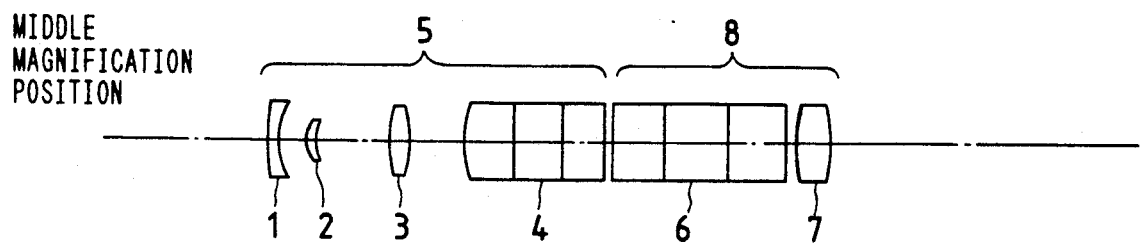
Figure 3C:
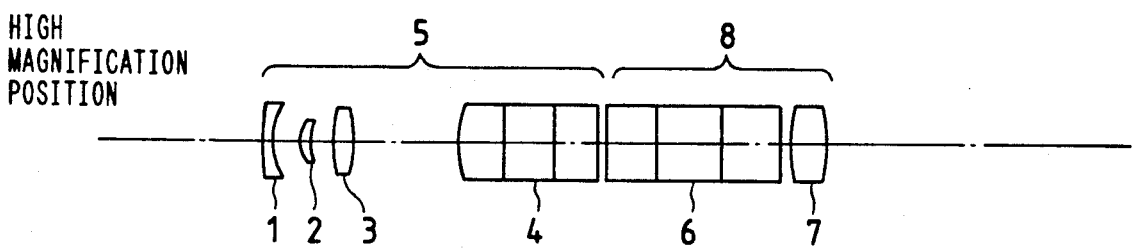

The first embodiment of the viewfinder optical system according to the present invention comprises, as shown in FIG. 3A, FIG. 3B and FIG. 3C: an objective lens system 5 which comprises a first lens unit 1 composed of a single negative lens component, a second lens unit 2 composed of a single positive lens component, a third lens unit 3 composed of a single positive lens component, and a fourth lens unit 4 which is a prism having a first reflecting surface $M_1$ and a second reflecting surface $M_2$ for erecting an image, and positive refractive power; and an eyepiece lens system 8 which comprises a prism 6 having a third reflecting surface $M_3$ and a fourth reflecting surface $M_4$ for erecting the image, and an eyepiece lens unit 7 composed of a single positive lens component. The first embodiment is configured so as to form an intermediate image on the surface of emergence of the fourth lens unit 4.

Figure 4:
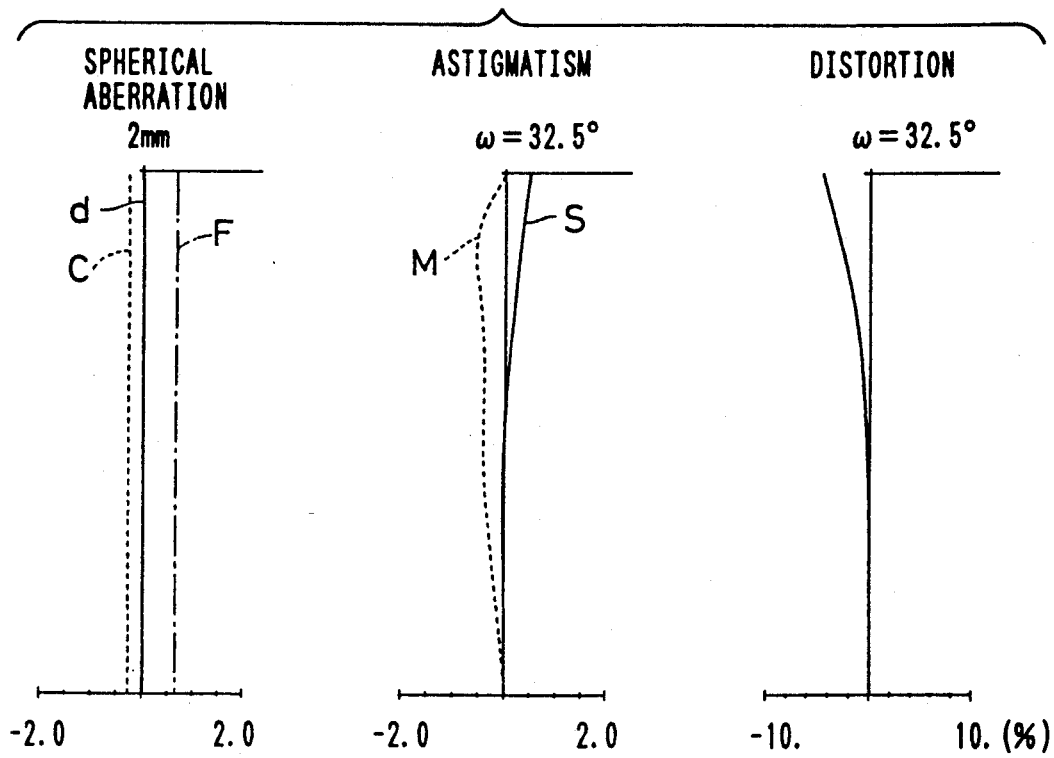
FIG. 4 shows graphs illustrating aberration characteristics at the low magnification position of the first embodiment.
Figure 5:
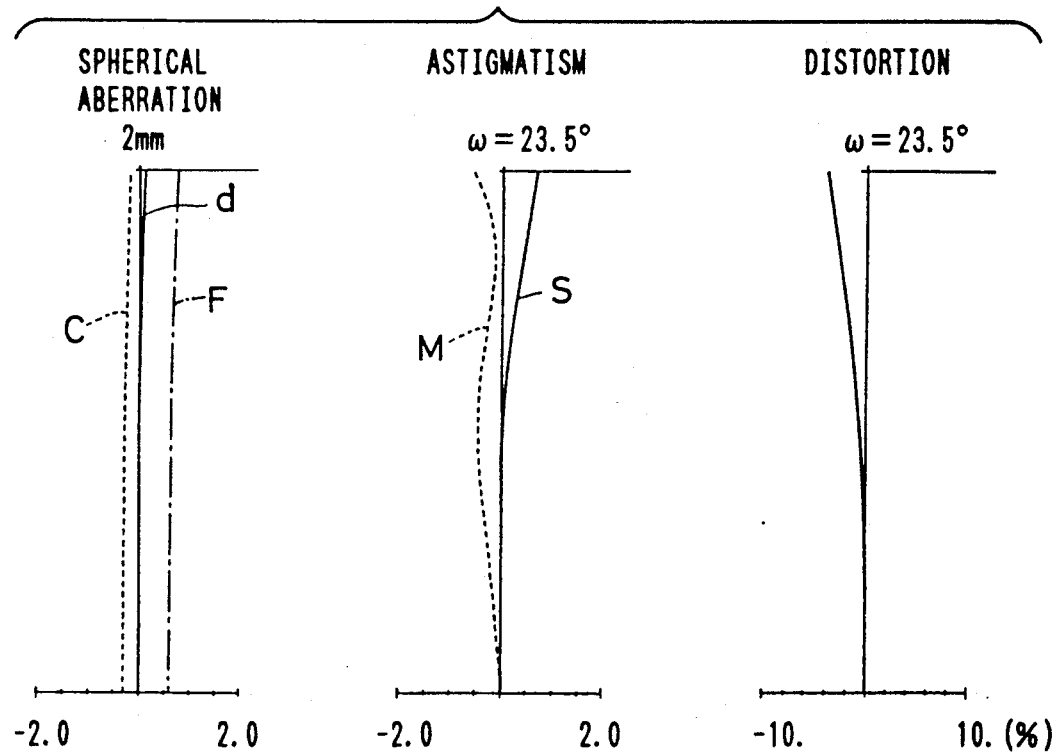
FIG. 5 shows graphs illustrating aberration characteristics at the middle magnification position of the first embodiment.
Figure 6:
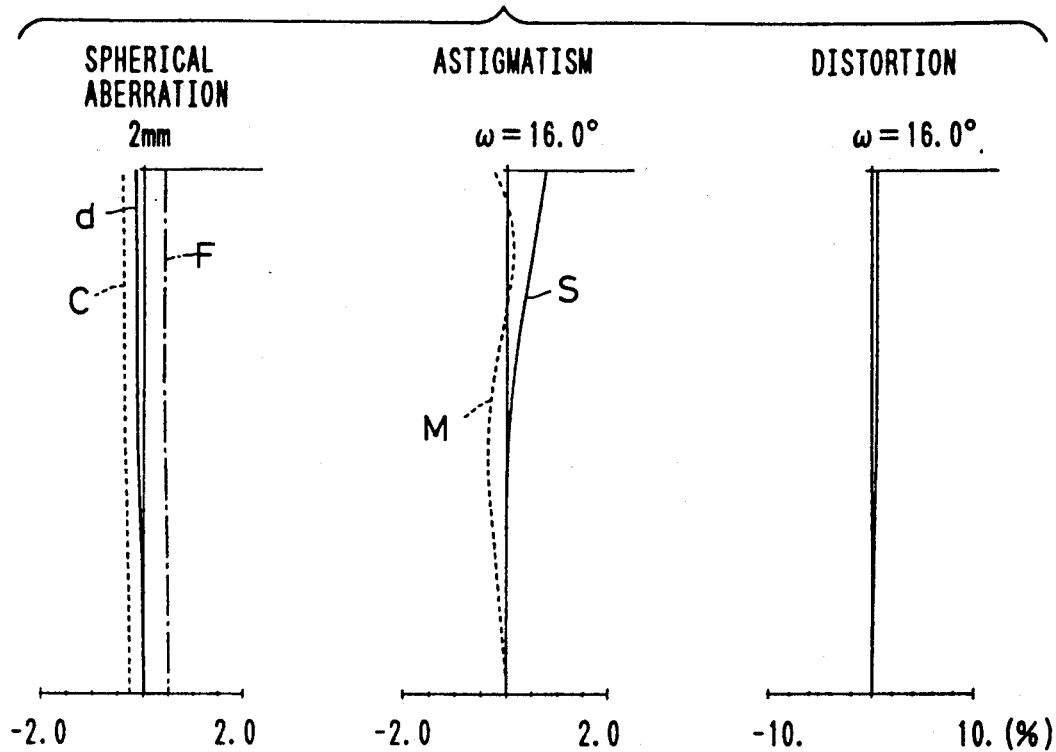
FIG. 6 shows graphs illustrating aberration characteristics at the high magnification position of the first embodiment.

The first embodiment is designed with the numerical data listed below and has the aberration characteristics illustrated in FIG. 4, FIG. 5 and FIG. 6 at the low magnification position middle magnification position and high magnification position thereof respectively.

---

Magnification of the viewfinder = 0.36~0.76, $f_2/f_w = 4.64$
Field angle of the viewfinder ($2\omega$) = 65.0°~32.0°,
$f_4/f_w = 3.73$, $|\beta_{23}| = 1.01~2.11$ $\gamma_1 = 54.6124$
$\qquad d_1 = 1.0000 \quad n_1 = 1.58362 \quad \upsilon_1 = 30.37$
$\gamma_2 = 7.3448$ (Aspherical surface)
$\qquad d_2 = 8.3401$ (Variable)
$\gamma_3 = 4.2291$ (Aspherical surface)
$\qquad d_3 = 1.5000 \quad n_2 = 1.49230 \quad \upsilon_2 = 57.71$ -continued Magnification of the viewfinder = 0.36~0.76, $f_2/f_w$ = 4.64
Field angle of the viewfinder (2ω) = 65.0°~32.0°,
$f_4/f_w$ = 3.73, $|\beta_{23}|$ = 1.01~2.11

$\gamma_4$ = 4.9451
 $d_4$ = 13.8467 (Variable)
$\gamma_5$ = 22.3570 (Aspherical surface)
 $d_5$ = 2.8131  $n_3$ = 1.49230  $\nu_3$ = 57.71
$\gamma_6$ = −15.9292
 $d_6$ = 0.5000 (Variable)
$\gamma_7$ = 13.8872 (Aspherical surface)
 $d_7$ = 20.5000  $n_4$ = 1.49230  $\nu_4$ = 57.71
$\gamma_8$ = ∞
 $d_8$ = 1.0000
$\gamma_9$ = ∞
 $d_9$ = 25.000  $n_5$ = 1.49230  $\nu_5$ = 57.71
$\gamma_{10}$ = ∞
 $d_{10}$ = 1.3916
$\gamma_{11}$ = 19.0006 (Aspherical surface)
 $d_{11}$ = 4.8975  $n_6$ = 1.49230  $\nu_6$ = 57.71
$\gamma_{12}$ = −20.7486
 $d_{12}$ = 18.9969
$\gamma_{13}$ (Pupil)

Aspherical coefficient

Second surface
 E = −0.59278 × 10$^{-3}$,  F = −0.16171 × 10$^{-4}$,
 G = 0.69520 × 10$^{-6}$
Third surface
 E = −0.79977 × 10$^{-3}$,  F = 0.64308 × 10$^{-5}$,
 G = −0.23514 × 10$^{-5}$
Fifth surface
 E = −0.50483 × 10$^{-4}$,  F = −0.23564 × 10$^{-5}$,
 G = 0.10484 × 10$^{-6}$
Seventh surface
 E = −0.10553 × 10$^{-3}$,  F = 0.39890 × 10$^{-5}$,
 G = −0.85819 × 10$^{-7}$
Eleventh surface
 E = −0.66373 × 10$^{-4}$,  F = 0.14072 × 10$^{-6}$,
 G = −0.59412 × 10$^{-8}$ Data of zooming

|  | Low magnification | Middle magnification | High magnification |
|---|---|---|---|
| $d_2$ | 8.340 | 4.157 | 4.127 |
| $d_4$ | 13.840 | 10.746 | 3.530 |
| $d_6$ | 0.500 | 7.784 | 15.029 |

| Condition (6) | −1.311 |
| Condition (7) | 0.078 |
| Condition (8) | 0.638 |

Second embodiment

Figure 7A:
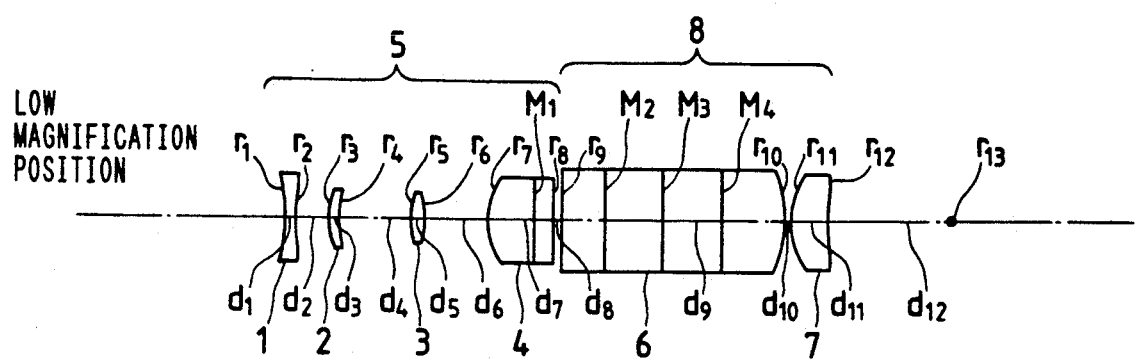
FIG. 7A, FIG. 7B and FIG. 7C are expansion plans of a low magnification position, a middle magnification position and a high magnification position respectively of a second embodiment of the viewfinder optical system according to the present invention.
Figure 7B:
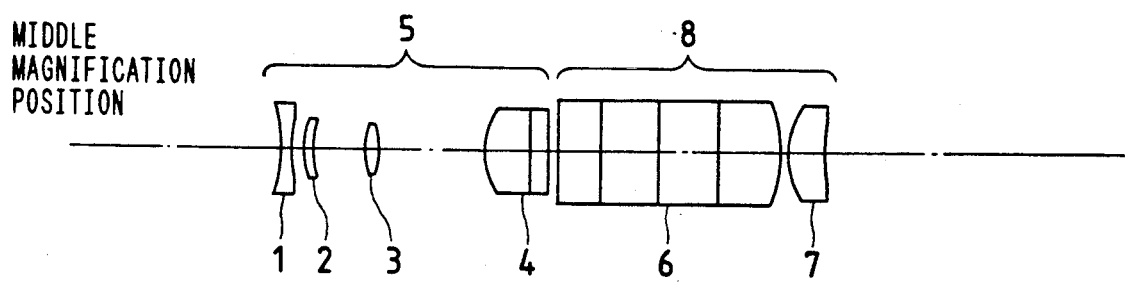
Figure 7C:
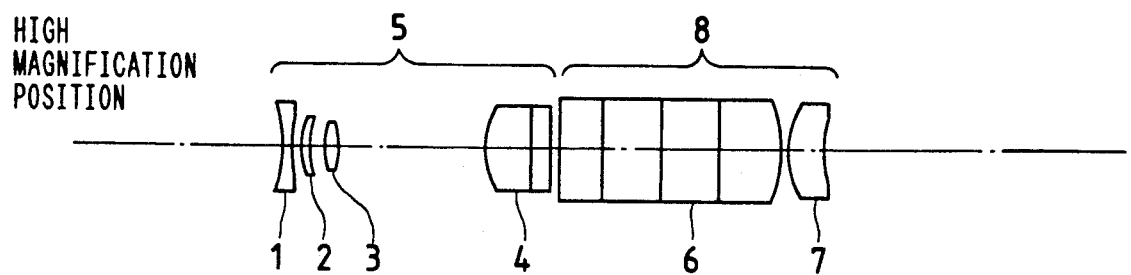

The second embodiment comprises, as illustrated in FIG. 7A, FIG. 7B and FIG. 7C: an objective lens system 5 which consists of a first lens unit 1 composed of a single negative lens component, a second lens unit 2 composed of a single positive lens component, a third lens unit 3 composed of a single positive lens component, and a fourth lens unit 4 which is a prism having a first reflecting surface M$_1$ for erecting an image and positive refractive power; and an eyepiece lens system 8 which consists of a prism 6 having a second reflecting surface M$_2$, a third reflecting surface M$_3$ and a fourth reflecting surface M$_4$, and an eyepiece lens unit 7 composed of a single positive lens component. The fourth embodiment is configured so as to form an intermediate image on a surface of emergence of the fourth lens unit 4.

Figure 8:
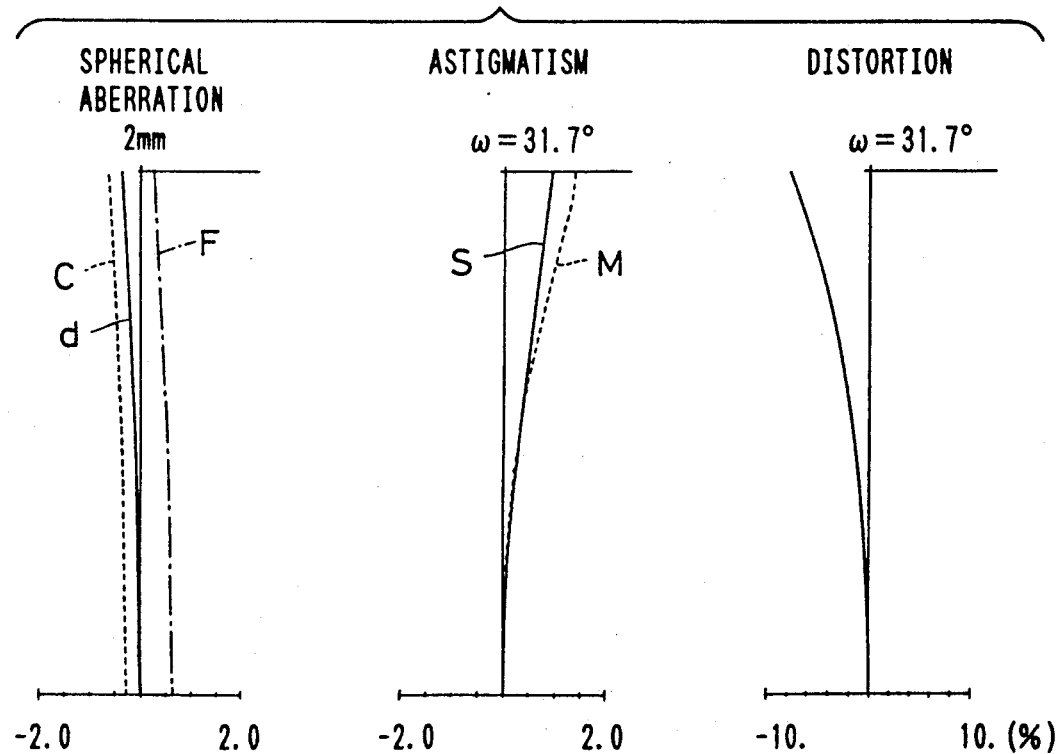
FIG. 8 shows curves illustrating aberration characteristics at the low magnification position of the second embodiment.
Figure 9:
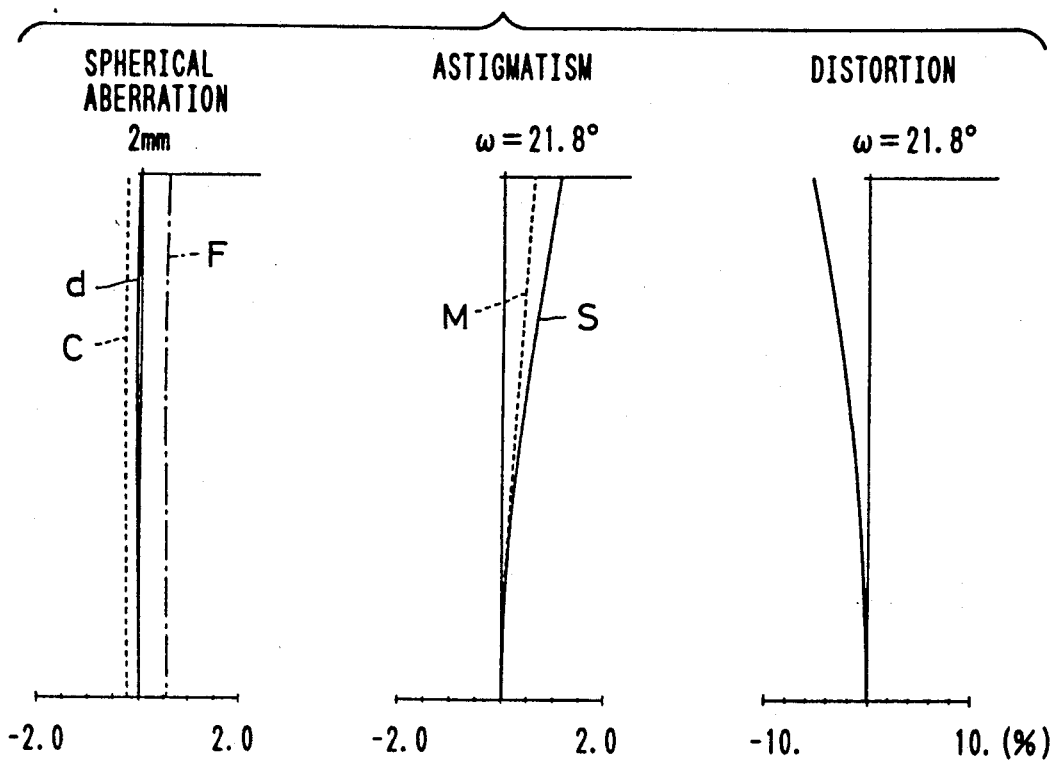
FIG. 9 shows curves illustrating aberration characteristics at the middle magnification position of the second embodiment.
Figure 10:
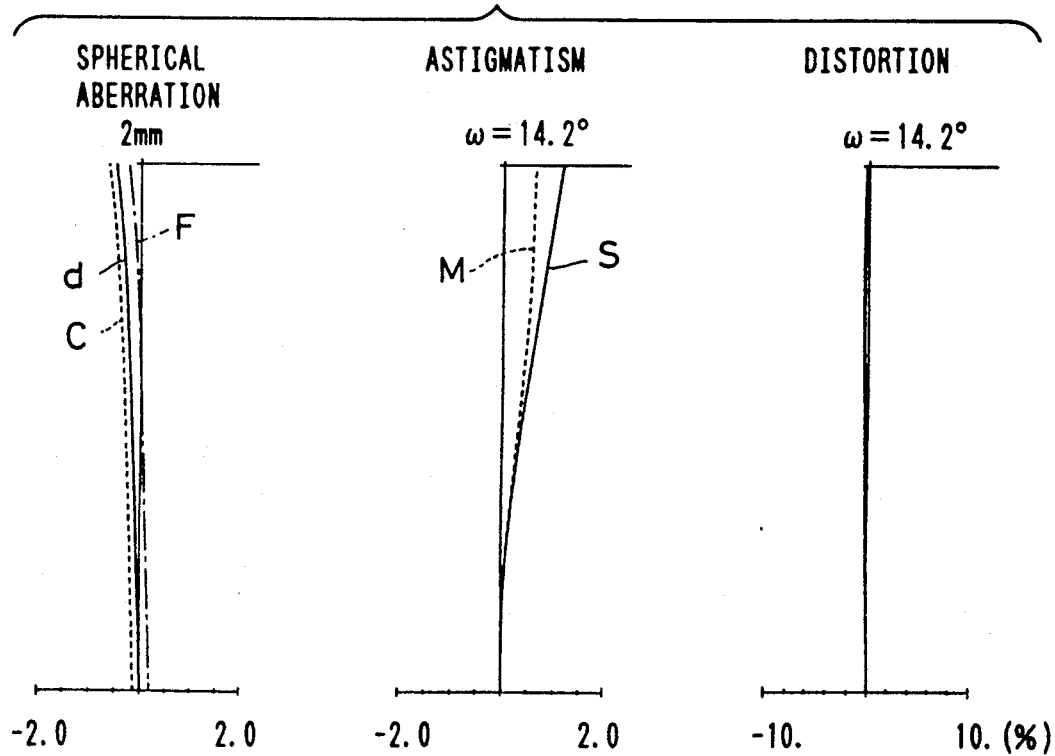
FIG. 10 shows curves illustrating aberration characteristics at the high magnification position of the second embodiment.

The fourth embodiment is designed with the numerical data listed below and has the aberration characteristics visualized in FIG. 8, FIG. 9 and FIG. 10 at the low magnification position, middle magnification position and high magnification position thereof respectively.

Magnification of the viewfinder = 0.36~0.81, $f_2/f_w$ = 2.33
Field angle of the viewfinder (2ω) = 63.4°~28.4°,
$f_4/f_w$ = 2.92, $|\beta_{23}|$ = 1.10~2.48

$\gamma_1$ = −17.7499
 $d_1$ = 1.0000  $n_1$ = 1.58362  $\nu_1$ = 30.37
$\gamma_2$ = 8.3198 (Aspherical surface)
 $d_2$ = 4.8333 (Variable)
$\gamma_3$ = 5.6779 (Aspherical surface)
 $d_3$ = 1.5411  $n_2$ = 1.49230  $\nu_2$ = 57.71
$\gamma_4$ = 15.0310
 $d_4$ = 10.0475 (Variable)
$\gamma_5$ = 15.0642 (Aspherical surface)
 $d_5$ = 1.6516  $n_3$ = 1.49230  $\nu_3$ = 57.71
$\gamma_6$ = −13.6408
 $d_6$ = 8.9301 (Variable)
$\gamma_7$ = 10.8787
 $d_7$ = 9.2888  $n_4$ = 1.49230  $\nu_4$ = 57.71
$\gamma_8$ = ∞
 $d_8$ = 1.0000
$\gamma_9$ = ∞
 $d_9$ = 31.7178  $n_5$ = 1.49230  $\nu_5$ = 57.71
$\gamma_{10}$ = −17.4854
 $d_{10}$ = 1.0000
$\gamma_{11}$ = 12.1548 (Aspherical surface)
 $d_{11}$ = 4.9248  $n_6$ = 1.49230  $\nu_6$ = 57.71
$\gamma_{12}$ = 18.5321
 $d_{12}$ = 15.0000
$\gamma_{13}$ (Pupil)

Aspherical coefficient

Second surface
 E = −0.20430 × 10$^{-2}$,  F = 0.21201 × 10$^{-4}$,
 G = −0.12153 × 10$^{-6}$
Third surface
 E = −0.25267 × 10$^{-2}$,  F = 0.71625 × 10$^{-6}$,
 G = −0.16661 × 10$^{-7}$
Fifth surface
 E = −0.18141 × 10$^{-3}$,  F = 0.32813 × 10$^{-4}$,
 G = −0.27440 × 10$^{-5}$
Eleventh surface
 E = −0.35281 × 10$^{-4}$,  F = −0.89458 × 10$^{-7}$,
 G = −0.15212 × 10$^{-8}$ Data of zooming

|  | Low magnification | Middle magnification | High magnification |
|---|---|---|---|
| $d_2$ | 4.833 | 1.833 | 1.200 |
| $d_4$ | 10.047 | 7.203 | 1.908 |
| $d_6$ | 8.930 | 14.775 | 20.703 |

| Condition (6) | −0.362 |
| Condition (7) | 0.452 |
| Condition (8) | 0.011 |

Third embodiment

Figure 11A:
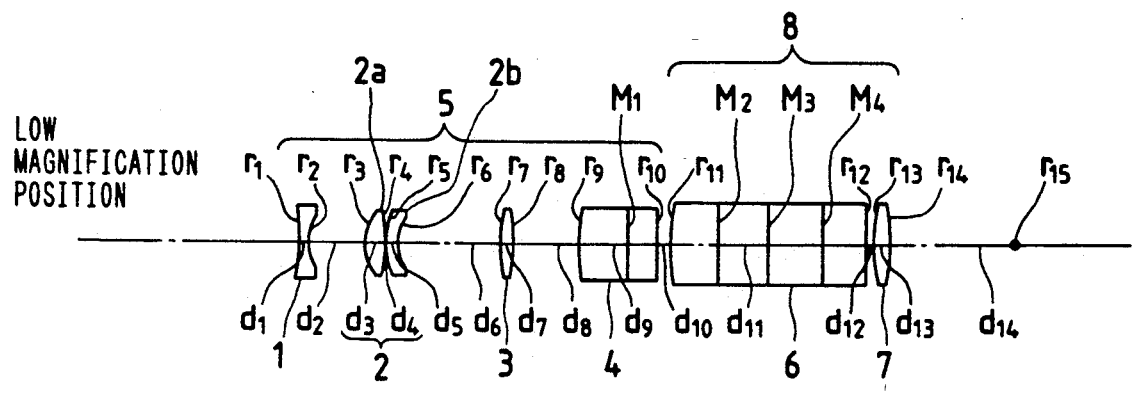
FIG. 11A, FIG. 11B and FIG. 11C are expansion plans illustrating a low magnification position, a middle magnification position and a high magnification position respectively of a third embodiment of the viewfinder optical system according to the present invention.
Figure 11B:
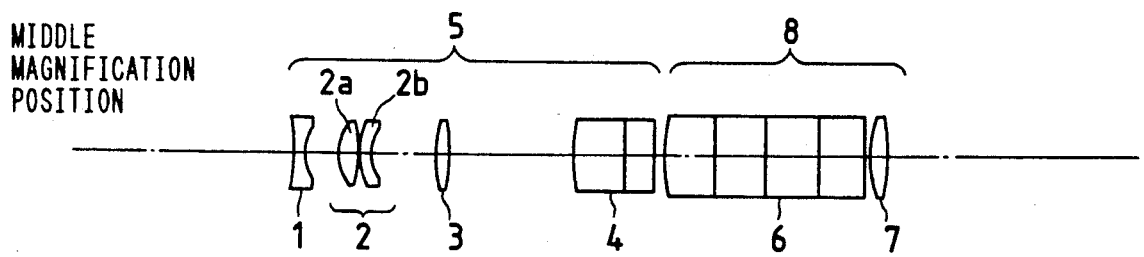
Figure 11C:
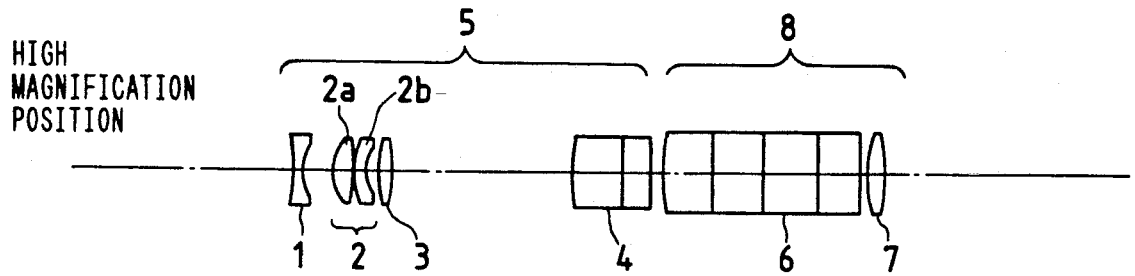

The third embodiment comprises, as shown in FIG. 11A, FIG. 11B and FIG. 11C: an objective lens system 5 which consists of a first lens unit 1 composed of a single negative lens component, a second lens unit 2 composed of a single positive lens component 2a and a single negative lens component 2b and has positive refractive power as a whole, a third lens unit 3 composed of a single positive lens component, and a fourth lens unit 4 which is a prism having a first reflecting surface M$_1$ for erecting an image and positive refractive power; and an eyepiece lens system 8 which consists of a prism 6 having a second reflecting surface M$_2$, and third reflecting surface M$_3$ and a fourth reflecting surface $M_4$, and an eyepiece lens unit 7. The third embodiment is configured so as to form an intermediate image on a surface of emergence of the fourth lens unit 4.

Figure 12:
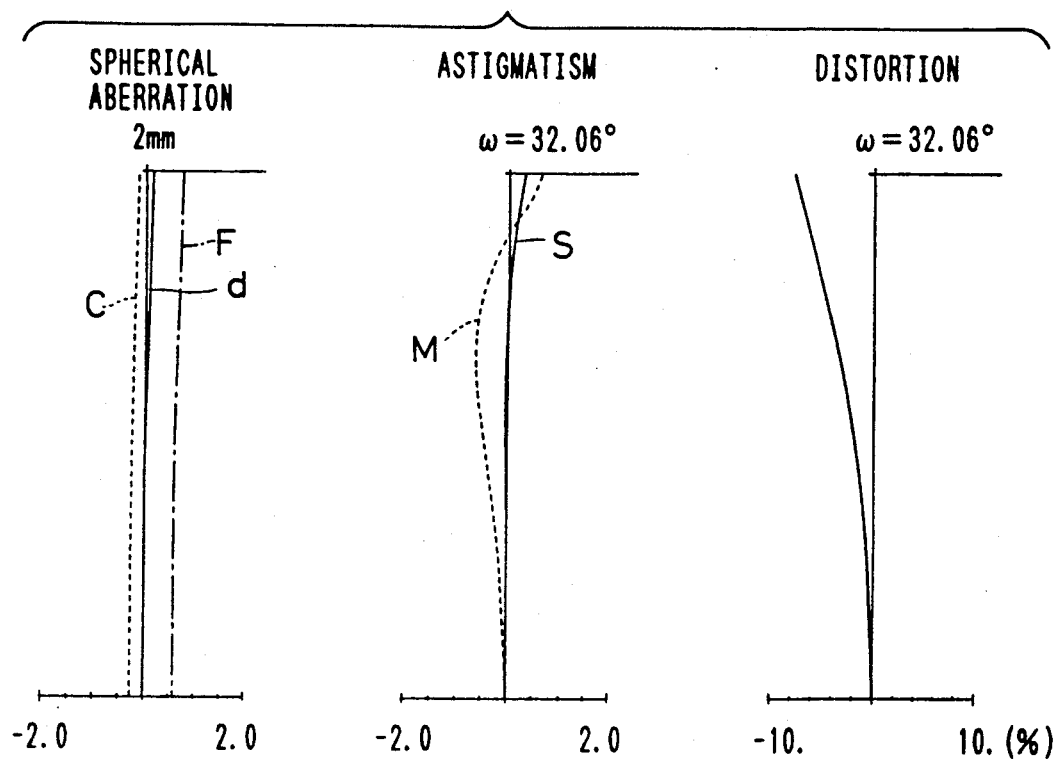
FIG. 12 shows graphs illustrating aberration characteristics at the low magnification position of the third embodiment.
Figure 13:
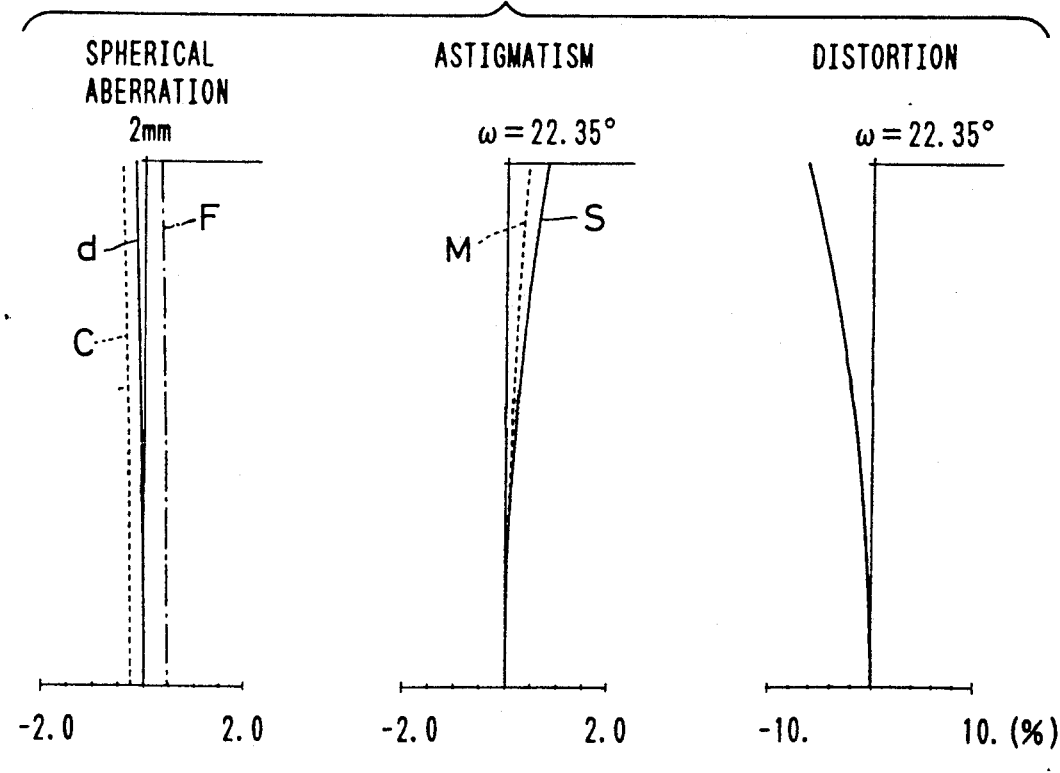
FIG. 13 shows graphs illustrating aberration characteristics at the middle magnification position of the third embodiment.
Figure 14:
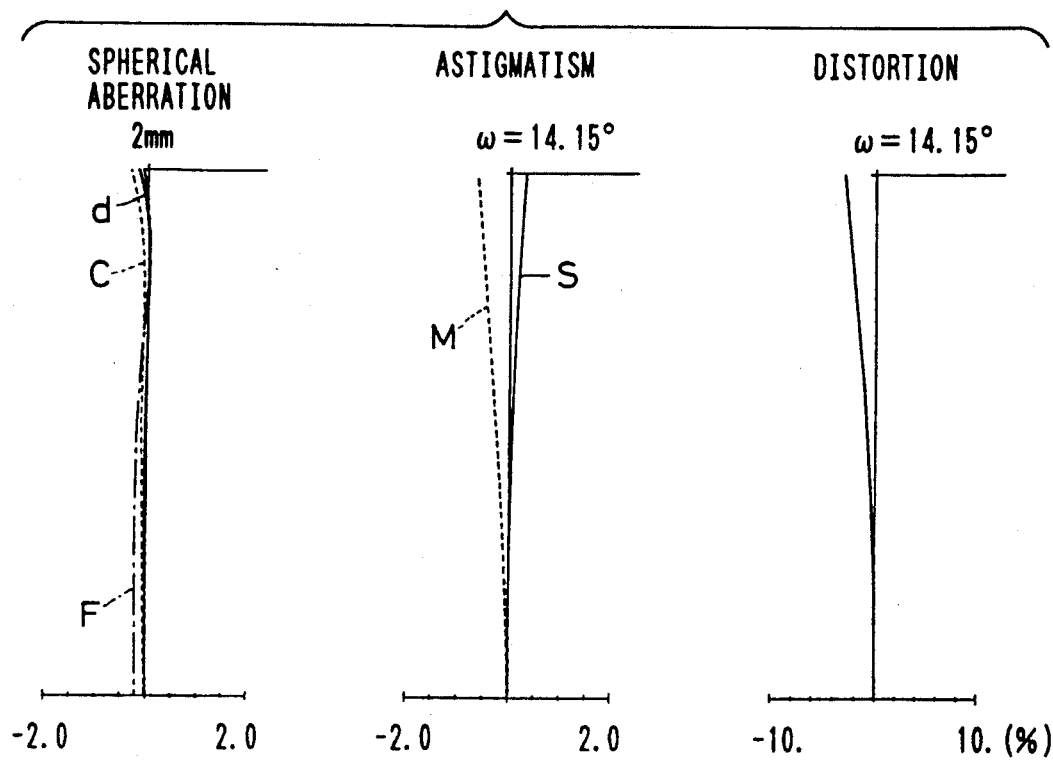
FIG. 14 shows graphs illustrating aberration characteristics at the high magnification position of the third embodiment.

The third embodiment is designed with the numerical data shown below and has the aberration characteristics illustrated in FIG. 12, FIG. 13 and FIG. 14 at the low magnification position, middle magnification position and high magnification position thereof respectively.

Magnification of the viewfinder = 0.36~0.85, $f_2/f_w = 1.85$
Field angle of the viewfinder ($2\omega$) = 64.1°~28.4°,
$f_4/f_w = 8.06$, $|\beta_{23}| = 1.30~3.07$ $\gamma_1 = -20.3447$
  $d_1 = 1.0000$  $n_1 = 1.58362$  $\nu_1 = 30.37$
$\gamma_2 = 4.8808$ (Aspherical surface)
  $d_2 = 8.0692$ (Variable)
$\gamma_3 = 5.8196$ (Aspherical surface)
  $d_3 = 2.7938$  $n_2 = 1.49230$  $\nu_2 = 57.71$
$\gamma_4 = -24.5888$
  $d_4 = 0.2000$
$\gamma_5 = 12.5101$
  $d_5 = 1.5000$  $n_3 = 1.58362$  $\nu_3 = 30.37$
$\gamma_6 = 5.8819$
  $d_6 = 14.4028$ (Variable)
$\gamma_7 = 13.5810$ (Aspherical surface)
  $d_7 = 2.0134$  $n_4 = 1.49230$  $\nu_4 = 57.71$
$\gamma_8 = -20.2297$
  $d_8 = 9.2309$ (Variable)
$\gamma_9 = 30.0000$
  $d_9 = 11.5000$  $n_5 = 1.49230$  $\nu_5 = 57.71$
$\gamma_{10} = \infty$
  $d_{10} = 1.5088$
$\gamma_{11} = 24.1137$
  $d_{11} = 28.0000$  $n_6 = 1.49230$  $\nu_6 = 57.71$
$\gamma_{12} = \infty$
  $d_{12} = 0.7000$
$\gamma_{13} = 15.8349$ (Aspherical surface)
  $d_{13} = 2.2744$  $n_7 = 1.49230$  $\nu_7 = 57.71$
$\gamma_{14} = -31.5918$
  $d_{14} = 15.0000$
$\gamma_{15}$ (Pupil)

Aspherical coefficient

Second surface
  $E = -0.18516 \times 10^{-2}$,  $F = -0.14519 \times 10^{-4}$,
  $G = -0.17343 \times 10^{-5}$
Third surface
  $E = -0.73449 \times 10^{-3}$,  $F = -0.64918 \times 10^{-5}$,
  $G = -0.46454 \times 10^{-6}$
Seventh surface
  $E = -0.15786 \times 10^{-3}$,  $F = -0.81448 \times 10^{-6}$,
  $G = 0.41679 \times 10^{-7}$
Thirteenth surface
  $E = -0.12848 \times 10^{-3}$,  $F = -0.43360 \times 10^{-6}$,
  $G = -0.85149 \times 10^{-8}$ Data of zooming

|  | Low magnification | Middle magnification | High magnification |
|---|---|---|---|
| $d_2$ | 8.070 | 4.893 | 4.423 |
| $d_4$ | 14.403 | 9.102 | 1.800 |
| $d_6$ | 9.231 | 17.708 | 25.480 |
| Condition (6) | | | −0.613 |
| Condition (7) | | | 0.0053 |
| Condition (8) | | | 0.396 |

Fourth embodiment

Figure 15A:
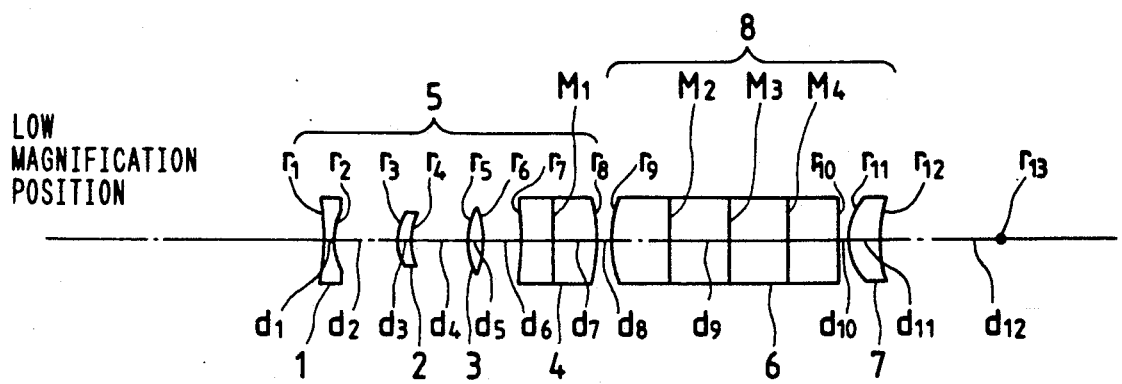
FIG. 15A, FIG. 15B and FIG. 15C are expansion plans illustrating a low magnification position, a middle magnification position and a high magnification position respectively of a fourth embodiment of the viewfinder optical system according to the present invention.
Figure 15B:
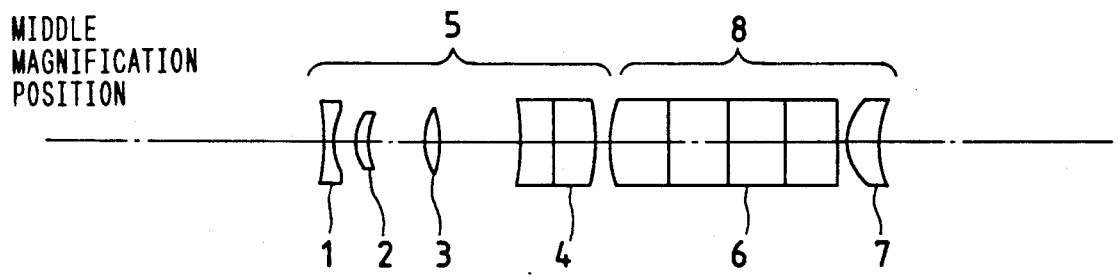
Figure 15C:
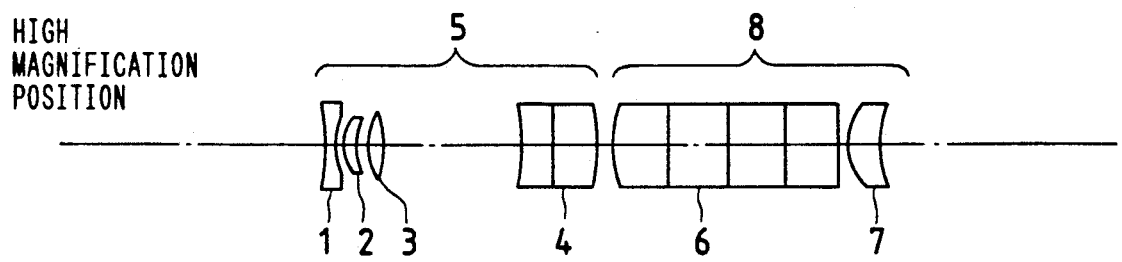

The fourth embodiment comprises, as shown in FIG. 15A, FIG. 15B and FIG. 15C: an objective lens system 5 which consists of a first lens unit 1 composed of a single negative lens component, a second lens unit 2 composed of a single positive lens component, a third lens unit 3 composed of a single positive lens component, and a fourth lens unit 4 which is a prism having a first reflecting surface for erecting an image, positive refractive power and a shape convex toward the image side; and an eyepiece lens system 8 which consists of a prism 6 having a second reflecting surface $M_2$, a third reflecting surface $M_3$ and a fourth reflecting surface $M_4$, and an eyepiece lens unit 7. The fourth embodiment is configured so as to form an intermediate image on a surface of emergence of the fourth lens unit 4.

Figure 16:
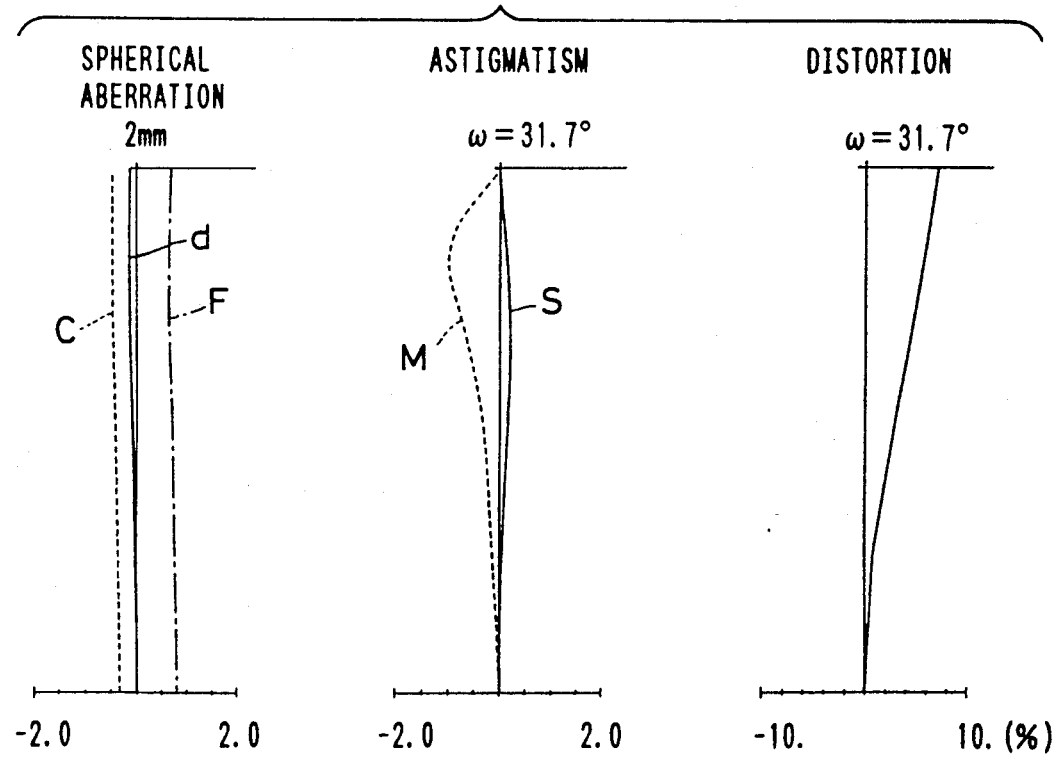
FIG. 16 shows curves visualizing aberration characteristics at the low magnification position of the fourth embodiment.
Figure 17:
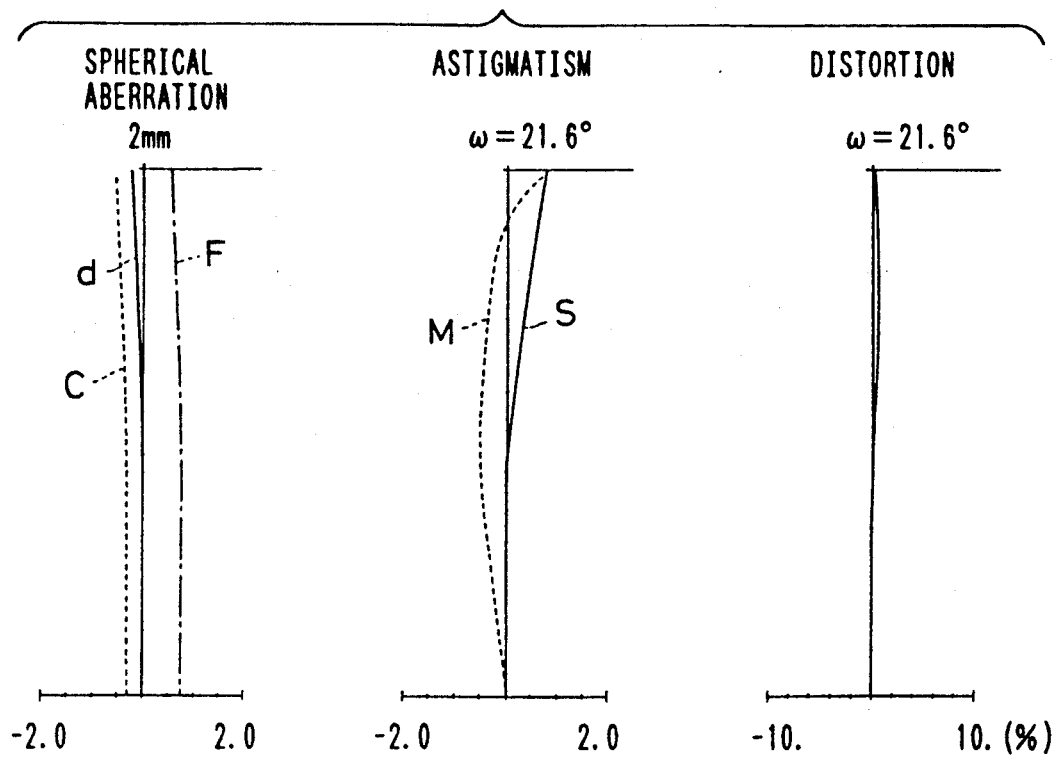
FIG. 17 shows curves visualizing aberration characteristics at the middle magnification of the fourth embodiment.
Figure 18:
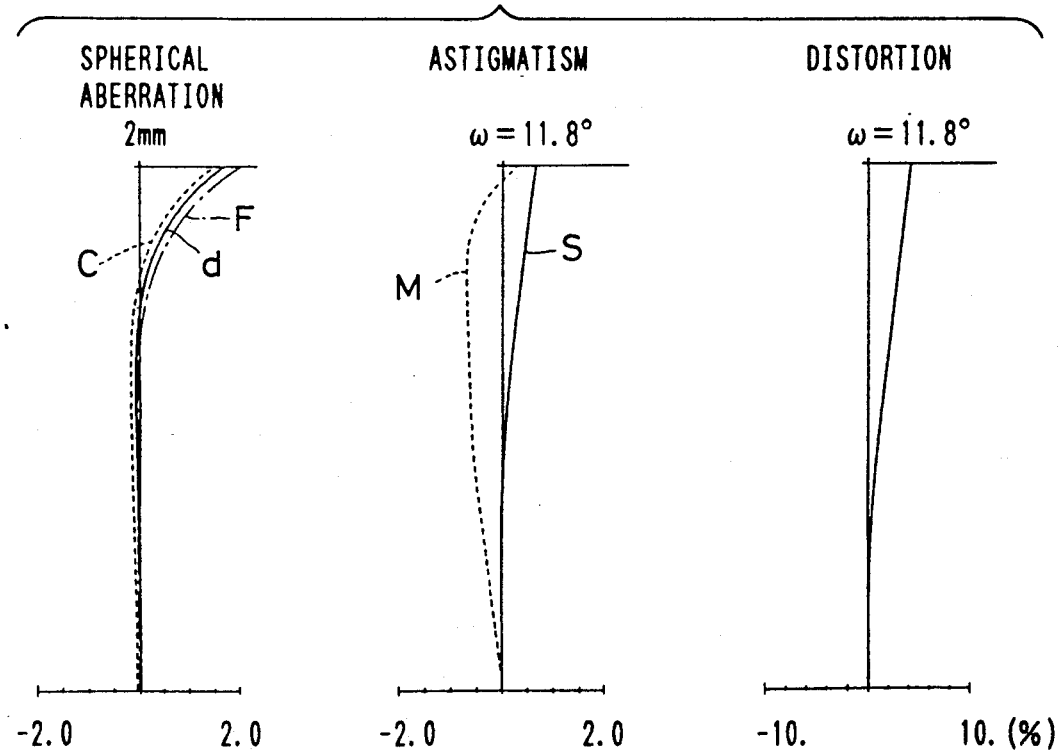
FIG. 18 shows curves visualizing aberration characteristics at the high magnification position of the fourth embodiment.

The fourth embodiment has the numerical data listed below and the aberration characteristics illustrated in FIG. 16, FIG. 17 and FIG. 18 at the low magnification position, middle magnification position and high magnification position thereof respectively.

Magnification of the viewfinder = 0.36~1.10, $f_2/f_w = 2.10$
Field angle of the viewfinder ($2\omega$) = 63.4°~23.6°,
$f_4/f_w = 11.27$, $|\beta_{23}| = 0.80~2.50$ $\gamma_1 = -66.1109$
  $d_1 = 1.0000$  $n_1 = 1.58362$  $\nu_1 = 30.37$
$\gamma_2 = 5.7868$ (Aspherical surface)
  $d_2 = 9.1669$ (Variable)
$\gamma_3 = 4.5614$ (Aspherical surface)
  $d_3 = 1.9553$  $n_2 = 1.49230$  $\nu_2 = 57.71$
$\gamma_4 = 9.4144$
  $d_4 = 8.1194$ (Variable)
$\gamma_5 = 10.8110$ (Aspherical surface)
  $d_5 = 2.0000$  $n_3 = 1.49230$  $\nu_3 = 57.71$
$\gamma_6 = -17.2905$
  $d_6 = 5.2661$ (Variable)
$\gamma_7 = -68.9557$ (Aspherical surface)
  $d_7 = 10.6673$  $n_4 = 1.49230$  $\nu_4 = 57.71$
$\gamma_8 = -27.4038$
  $d_8 = 2.0000$
$\gamma_9 = 13.6488$
  $d_9 = 32.0000$  $n_5 = 1.49230$  $\nu_5 = 57.71$
$\gamma_{10} = \infty$
  $d_{10} = 1.1590$
$\gamma_{11} = 7.0180$ (Aspherical surface)
  $d_{11} = 4.2547$  $n_6 = 1.49230$  $\nu_6 = 57.71$
$\gamma_{12} = 14.8880$
  $d_{12} = 15.0000$
$\gamma_{13}$ (Pupil)

Aspherical coefficient

Second surface
  $E = -0.20346 \times 10^{-2}$,  $F = 0.19328 \times 10^{-4}$,
  $G = -0.89468 \times 10^{-6}$
Third surface
  $E = -0.25383 \times 10^{-2}$,  $F = 0.48005 \times 10^{-4}$,
  $G = -0.56948 \times 10^{-5}$
Fifth surface
  $E = -0.22834 \times 10^{-3}$,  $F = -0.43132 \times 10^{-4}$,
  $G = 0.36460 \times 10^{-5}$
Seventh surface
  $E = -0.49891 \times 10^{-3}$,  $F = -0.21135 \times 10^{-5}$,
  $G = 0.76789 \times 10^{-6}$
Eleventh surface
  $E = -0.26893 \times 10^{-3}$,  $F = -0.23144 \times 10^{-5}$,
  $G = -0.12955 \times 10^{-6}$ Data of zooming

|  | Low magnification | Middle magnification | High magnification |
|---|---|---|---|
| $d_2$ | 9.167 | 3.345 | 1.500 |
| $d_4$ | 8.119 | 7.847 | 1.500 |
| $d_6$ | 5.266 | 11.360 | 19.552 |
| Condition (6) | | | −0.84 |
| Condition (7) | | | 0.347 |

-continued

Magnification of the viewfinder = 0.36~1.10, $f_2/f_w$ = 2.10
Field angle of the viewfinder (2ω) = 63.4°~23.6°,
$f_4/f_w$ = 11.27, $|\beta_{23}|$ = 0.80~2.50

| Condition (8) | 0.069 |
|---|---|

Fifth embodiment

In the fifth embodiment, an objective lens system 5 is composed, in order from the object side, of a first lens unit 1 consisting of a single negative lens component, a second lens unit 2 consisting of a single positive lens component, a third lens unit 3 consisting of a single positive lens component and a fourth lens unit 4 consisting of a prism which has a surface of incidence convex toward the third lens unit, and a first reflecting surface $M_1$ and a second reflecting surface $M_2$ for erecting an image. This embodiment uses an eyepiece lens system 8 composed of a reflecting member 6 which has a surface of incidence convex toward the fourth lens unit 4, and a third reflecting surface $M_3$ and a fourth reflecting surface $M_4$ for erecting an image, and a single positive lens unit 7 which is composed of a single positive lens component.

Figure 20:
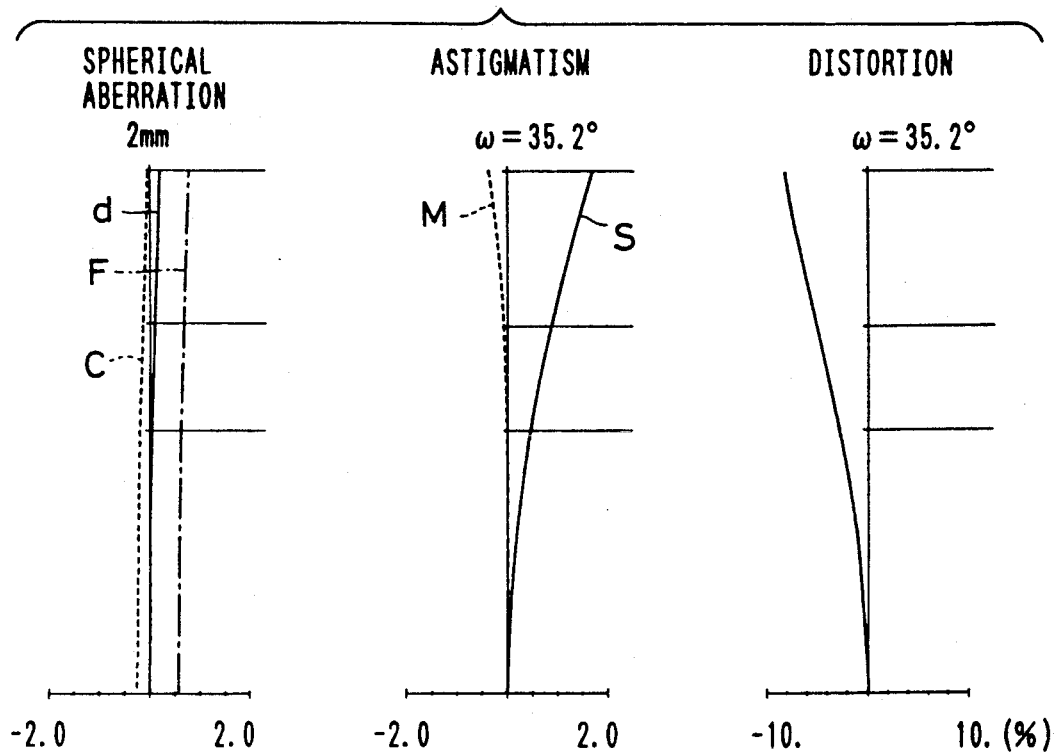
FIG. 20 shows graphs visualizing aberration characteristics at the low magnification position of the fifth embodiment.
Figure 21:
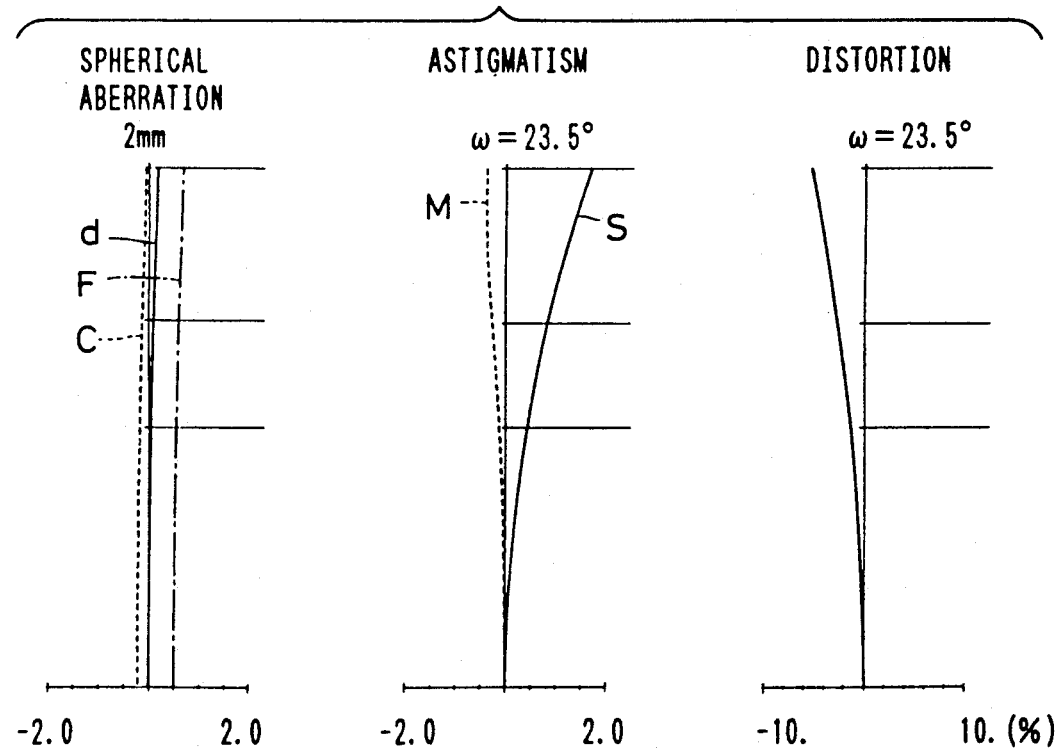
FIG. 21 shows graphs visualizing aberration characteristics at the middle magnification position of the fifth embodiment.

The fifth embodiment has the numerical data listed below and the aberration characteristics shown in FIG. 20, FIG. 21 and FIG. 22 at the low magnification position, middle magnification position and high magnification position thereof respectively.

Magnification of the viewfinder = 0.4~1.0,
Field angle of the viewfinder (2ω) = 70.4°~28.9°,
Field angle of emergence of the viewfinder = 28.9°,
$|L/f_1|$ = 2.86, $f_2/f_w$ = 3.96, $f_4/f_w$ = 4.44

$\gamma_1$ = 72.4915
  $d_1$ = 1.000   $n_1$ = 1.58362   $\nu_1$ = 30.37
$\gamma_2$ = 8.2315 (Aspherical surface)
  $d_2$ = 7.777 (Variable)
$\gamma_3$ = 8.0982 (Aspherical surface)
  $d_3$ = 1.500   $n_2$ = 1.49260   $\nu_2$ = 58.02
$\gamma_4$ = 14.3806
  $d_4$ = 10.480 (Variable)
$\gamma_5$ = 28.2145 (Aspherical surface)
  $d_5$ = 3.000   $n_3$ = 1.49260   $\nu_3$ = 58.02
$\gamma_6$ = −12.5585
  $d_6$ = 1.034 (Variable)
$\gamma_7$ = 19.2467
  $d_7$ = 21.000   $n_4$ = 1.49260   $\nu_4$ = 58.02
$\gamma_8$ = ∞
  $d_8$ = 1.000
$\gamma_9$ = 20.0986
  $d_9$ = 27.333   $n_5$ = 1.49260   $\nu_5$ = 58.02
$\gamma_{10}$ = ∞
  $d_{10}$ = 2.000
$\gamma_{11}$ = 23.4348 (Aspherical surface)
  $d_{11}$ = 3.000   $n_6$ = 1.49260   $\nu_6$ = 58.02
$\gamma_{12}$ = −20.4661
  $d_{12}$ = 15.000
$\gamma_{13}$ (Pupil)

Aspherical coefficient

Second surface
  E = −0.95198 × $10^{-4}$,   F = −0.65138 × $10^{-5}$
Third surface
  E = −0.78395 × $10^{-4}$,   F = −0.39161 × $10^{-5}$
Fifth surface
  E = −0.99185 × $10^{-4}$,   F = −0.14488 × $10^{-5}$
Twelfth surface
  E = −0.70155 × $10^{-4}$,   F = −0.18629 × $10^{-6}$ Data of zooming

| | Low magnification | Middle magnification | High magnification |
|---|---|---|---|
| $d_2$ | 7.7767 | 1.5694 | 1.0336 |
| $d_4$ | 10.4797 | 9.1024 | 1.2403 |
| $d_6$ | 1.0336 | 8.6182 | 17.0161 |

| Condition (6) | −1.256 |
|---|---|
| Condition (7) | 0.279 |
| Condition (8) | 0.325 |

Sixth embodiment

Figure 25:
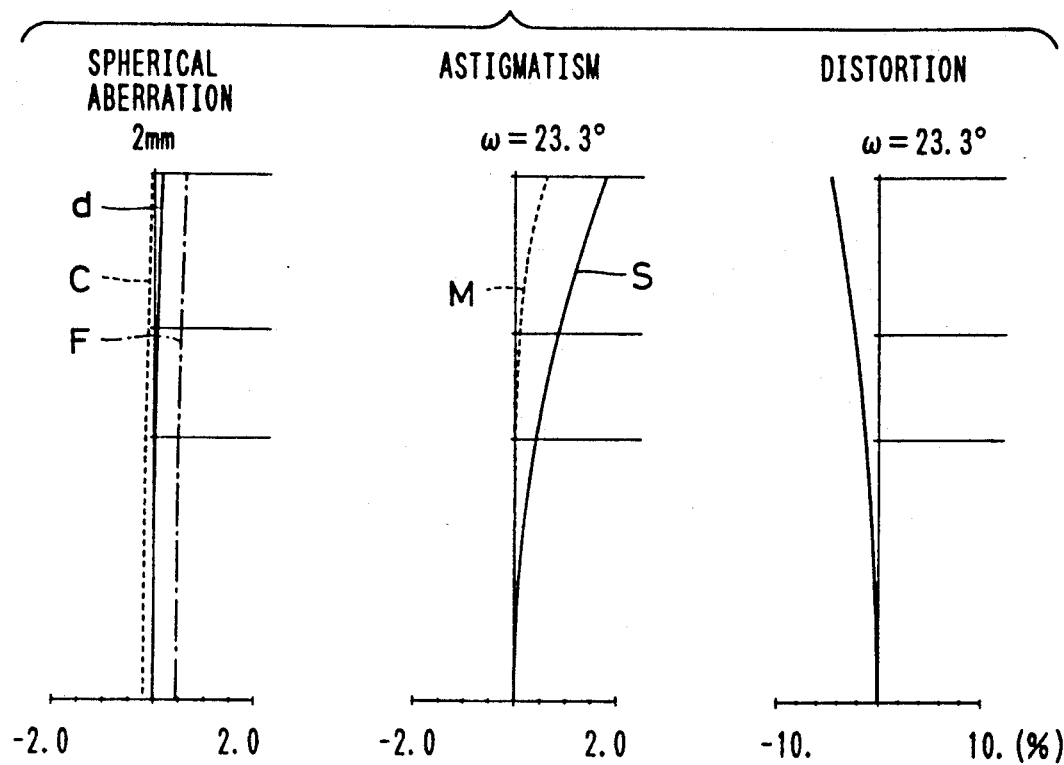
FIG. 25 shows graphs illustrating aberration characteristics at the middle magnification position of the sixth embodiment.
Figure 26:
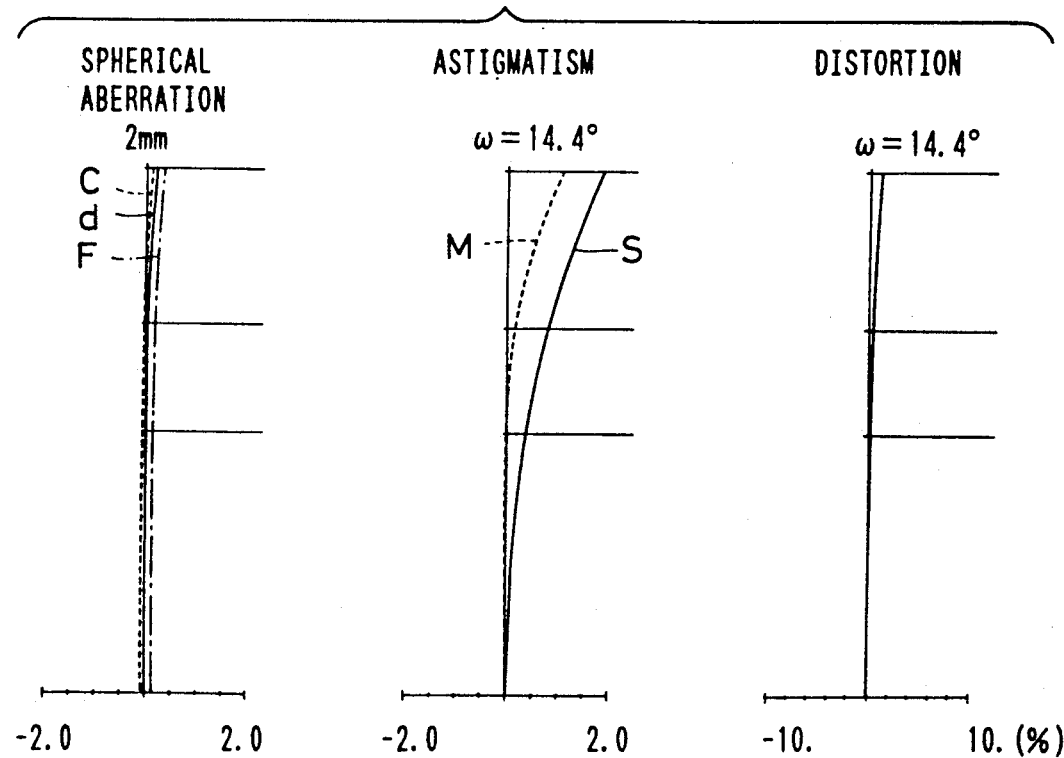
FIG. 26 shows graphs illustrating aberration characteristics at the high magnification position of the sixth embodiment.

The sixth embodiment has a composition which is similar to that of the fifth embodiment. Speaking concretely, the sixth embodiment has the compositions illustrated in FIG. 23A, FIG. 23B and FIG. 23C and exhibits the aberration characteristics visualized in FIG. 24, FIG. 25 and FIG. 26 at the low magnification position, middle magnification position and high magnification position thereof respectively.

The sixth embodiment has the numerical data listed below:

Magnification of the viewfinder = 0.4~1.0,
Field angle of the viewfinder (2ω) = 70.8°~28.7°,
Field angle of emergence of the viewfinder = 28.9°
$|L/f_1|$ = 2.89, $f_2/f_w$ = 3.88, $f_4/f_w$ = 4.49

$\gamma_1$ = 88.7554
  $d_1$ = 1.091   $n_1$ = 1.58362   $\nu_1$ = 30.37
$\gamma_2$ = 9.0121 (Aspherical surface)
  $d_2$ = 8.448 (Variable)
$\gamma_3$ = 8.7828 (Aspherical surface)
  $d_3$ = 1.636   $n_2$ = 1.49260   $\nu_2$ = 58.02
$\gamma_4$ = 15.7950
  $d_4$ = 11.426 (Variable)
$\gamma_5$ = 30.9895 (Aspherical surface)
  $d_5$ = 3.273   $n_3$ = 1.49260   $\nu_3$ = 58.02
$\gamma_6$ = −13.6198
  $d_6$ = 1.128 (Variable)
$\gamma_7$ = 21.2490
  $d_7$ = 22.909   $n_4$ = 1.49260   $\nu_4$ = 58.02
$\gamma_8$ = ∞
  $d_8$ = 1.000
$\gamma_9$ = 20.9916
  $d_9$ = 29.982   $n_5$ = 1.49260   $\nu_5$ = 58.02
$\gamma_{10}$ = ∞
  $d_{10}$ = 2.000
$\gamma_{11}$ = 26.7114 (Aspherical surface)
  $d_{11}$ = 3.500   $n_6$ = 1.49260   $\nu_6$ = 58.02
$\gamma_{12}$ = −21.4568
  $d_{12}$ = 15.000
$\gamma_{13}$ (Pupil)

Aspherical coefficient

Second surface
  E = −0.48468 × $10^{-4}$,   F = −0.40233 × $10^{-5}$
Third surface
  E = −0.47659 × $10^{-4}$,   F = −0.11819 × $10^{-5}$
Fifth surface
  E = −0.85905 × $10^{-4}$,   F = −0.21851 × $10^{-6}$
Twelfth surface
  E = −0.48196 × $10^{-4}$,   F = −0.92939 × $10^{-7}$ Data of zooming

| | Low magnification | Middle magnification | High magnification |
|---|---|---|---|
| $d_2$ | 8.4483 | 1.7513 | 1.1276 |
| $d_4$ | 11.4258 | 9.8682 | 1.3531 |
| $d_6$ | 1.1276 | 9.3819 | 18.5203 |

| Condition (6) | −1.226 |
|---|---|

-continued

Magnification of the viewfinder = 0.4~1.0,
Field angle of the viewfinder (2ω) = 70.8°~28.7°,
Field angle of emergence of the viewfinder = 28.9°
$|L/f_1| = 2.89, f_2/f_w = 3.88, f_4/f_w = 4.49$

| | |
|---|---|
| Condition (7) | 0.285 |
| Condition (8) | 0.325 |

Seventh embodiment

Figure 28:
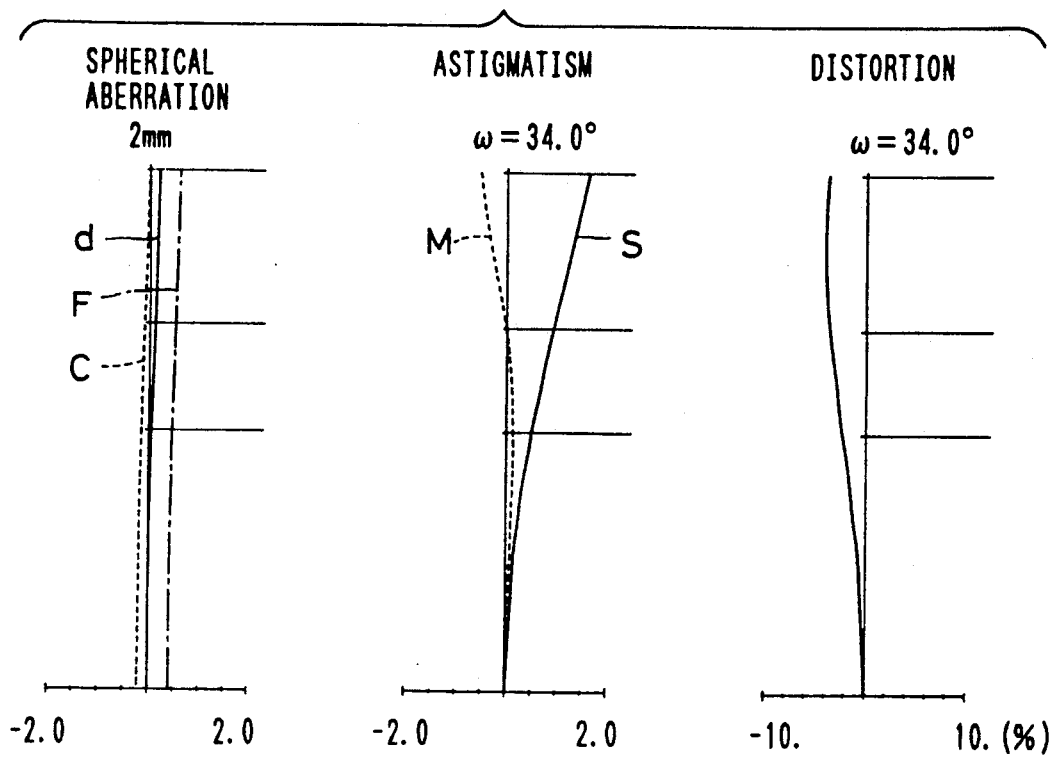
FIG. 28 shows curves illustrating aberration characteristics at the low magnification position of the seventh embodiment.
Figure 29:
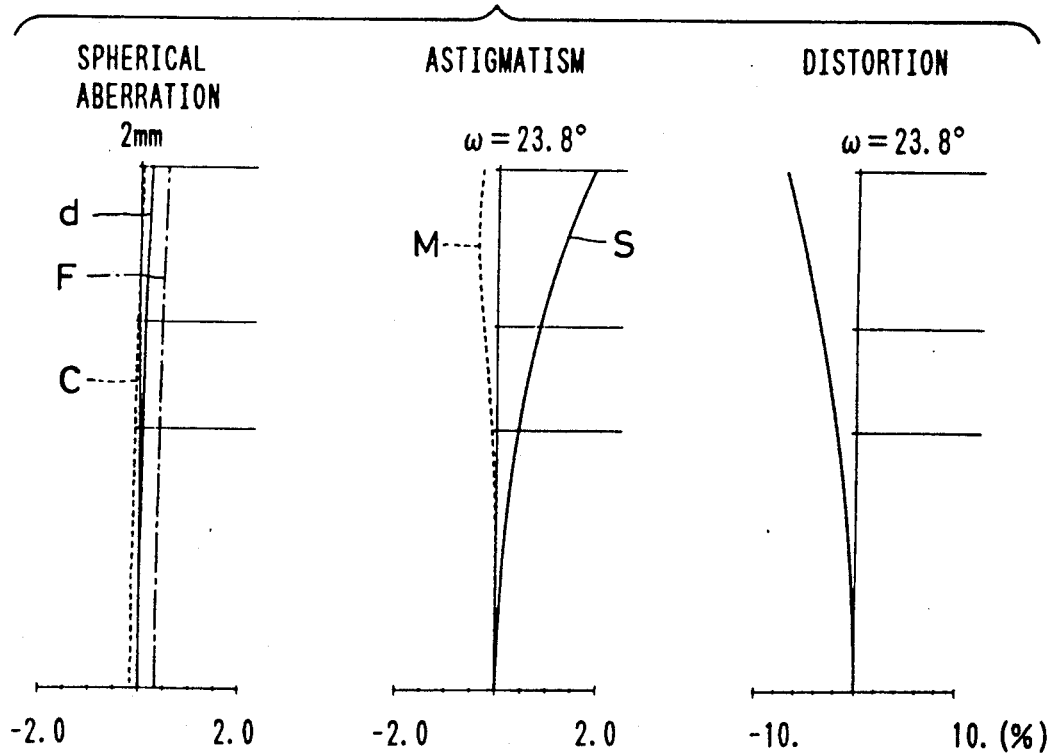
FIG. 29 shows curves illustrating aberration characteristics at the middle magnification position of the seventh embodiment.
Figure 30:
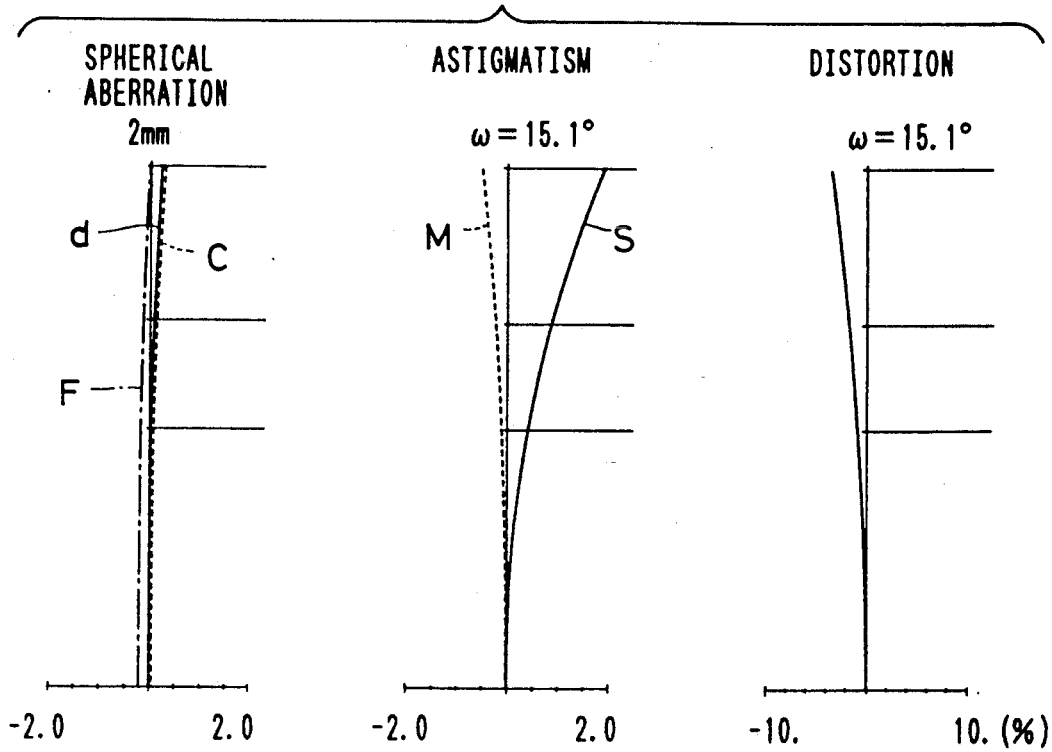
FIG. 30 shows curves illustrating aberration characteristics at the high magnification position of the seventh embodiment.

The seventh embodiment has the same composition as that of the sixth embodiment, except for the second lens unit 2 which is composed of a single lens component 2a and a single positive lens component 2b, and has positive refractive power in the seventh embodiment. At a low magnification position, a middle magnification position and a high magnification position, the seventh embodiment has the compositions shown in FIG. 27A, FIG. 27B and FIG. 27C, and the aberration characteristics illustrated in FIG. 28, FIG. 29 and FIG. 30 respectively.

The seventh embodiment is designed with the numerical data listed below:

Magnification of the viewfinder = 0.4~1.0,
Field angle of the viewfinder (2ω) = 68.1°~30.2°,
Field angle of emergence of the viewfinder = 29.1°
$|L/f_1| = 2.58, f_2/f_w = 4.71, f_4/f_w = 3.52$ $\gamma_1 = 53.4569$
 $d_1 = 1.000$ $n_1 = 1.58362$ $\nu_1 = 30.37$
$\gamma_2 = 9.4437$ (Aspherical surface)
 $d_2 = 10.707$ (Variable)
$\gamma_3 = 8.6246$ (Aspherical surface)
 $d_3 = 1.000$ $n_2 = 1.58362$ $\nu_2 = 30.37$
$\gamma_4 = 5.3498$
 $d_4 = 0.322$
$\gamma_5 = 5.8490$
 $d_5 = 2.500$ $n_3 = 1.49260$ $\nu_3 = 58.02$
$\gamma_6 = 21.2335$
 $d_6 = 10.478$ (Variable)
$\gamma_7 = 40.4837$ (Aspherical surface)
 $d_7 = 3.000$ $n_4 = 1.49260$ $\nu_4 = 58.02$
$\gamma_8 = -14.1926$
 $d_8 = 1.048$ (Variable)
$\gamma_9 = 15.2484$
 $d_9 = 21.000$ $n_5 = 1.49260$ $\nu_5 = 58.02$
$\gamma_{10} = \infty$
 $d_{10} = 1.000$
$\gamma_{11} = 28.0845$
 $d_{11} = 27.333$ $n_6 = 1.49260$ $\nu_6 = 58.02$
$\gamma_{12} = \infty$
 $d_{12} = 2.000$
$\gamma_{13} = 19.3831$ (Aspherical surface)
 $d_{13} = 3.000$ $n_7 = 1.49260$ $\nu_7 = 58.02$
$\gamma_{14} = -24.5371$
 $d_{14} = 15.000$
$\gamma_{15}$ (Pupil)

Aspherical coefficient

Second surface
 $E = -0.10080 \times 10^{-3}$, $F = -0.31810 \times 10^{-5}$
Third surface
 $E = 0.51364 \times 10^{-4}$, $F = 0.50722 \times 10^{-5}$
Seventh surface
 $E = -0.53609 \times 10^{-4}$, $F = -0.20101 \times 10^{-5}$
Fourteenth surface
 $E = -0.72341 \times 10^{-4}$, $F = -0.46351 \times 10^{-6}$ Data of zooming

| | Low magnification | Middle magnification | High magnification |
|---|---|---|---|
| $d_2$ | 10.7072 | 2.2903 | 1.0476 |
| $d_6$ | 10.4778 | 9.8806 | 1.2571 |

-continued

Magnification of the viewfinder = 0.4~1.0,
Field angle of the viewfinder (2ω) = 68.1°~30.2°,
Field angle of emergence of the viewfinder = 29.1°
$|L/f_1| = 2.58, f_2/f_w = 4.71, f_4/f_w = 3.52$

| $d_8$ | 1.0476 | 10.0618 | 19.9279 |
|---|---|---|---|

| | |
|---|---|
| Condition (6) | −1.429 |
| Condition (7) | 0.422 |
| Condition (8) | 0.312 |

Eighth embodiment

Figure 32:
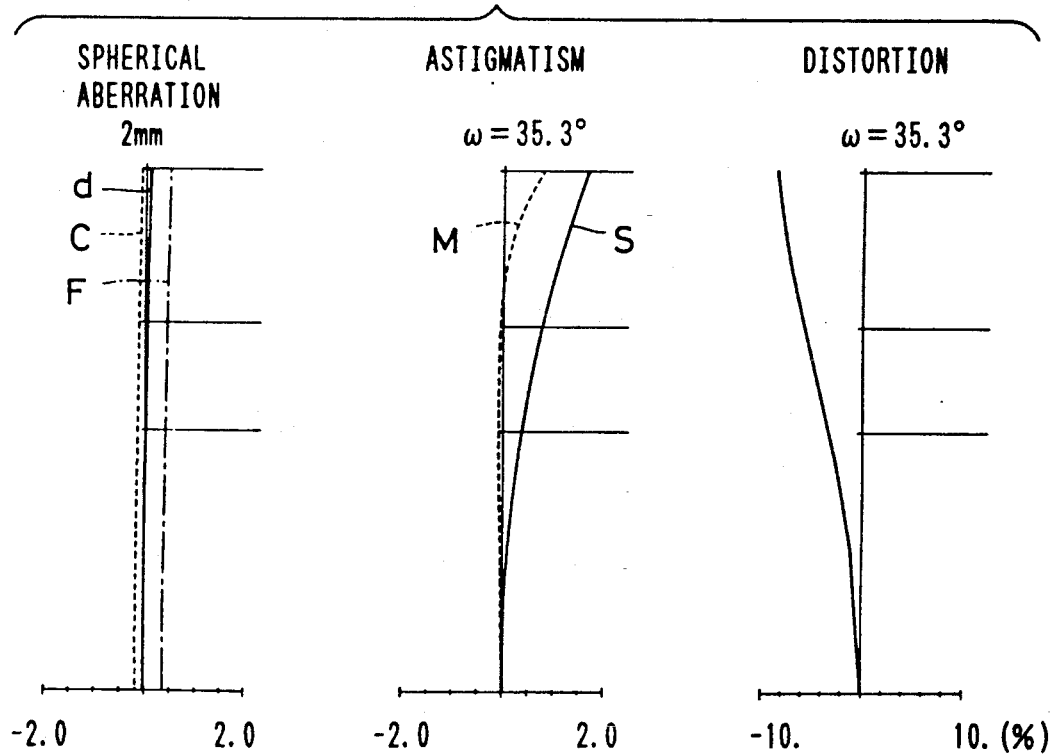
FIG. 32 shows curves illustrating aberration characteristics at the low magnification position of the eighth embodiment.
Figure 33:
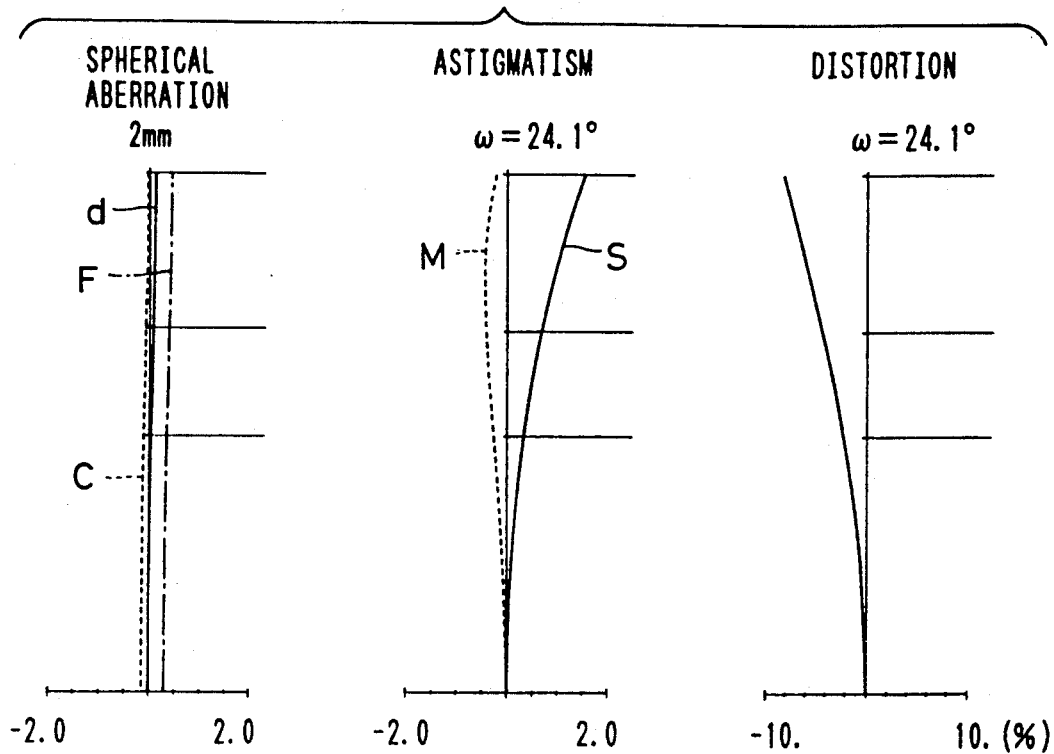
FIG. 33 shows curves illustrating aberration characteristics at the middle magnification position of the eighth embodiment.
Figure 34:
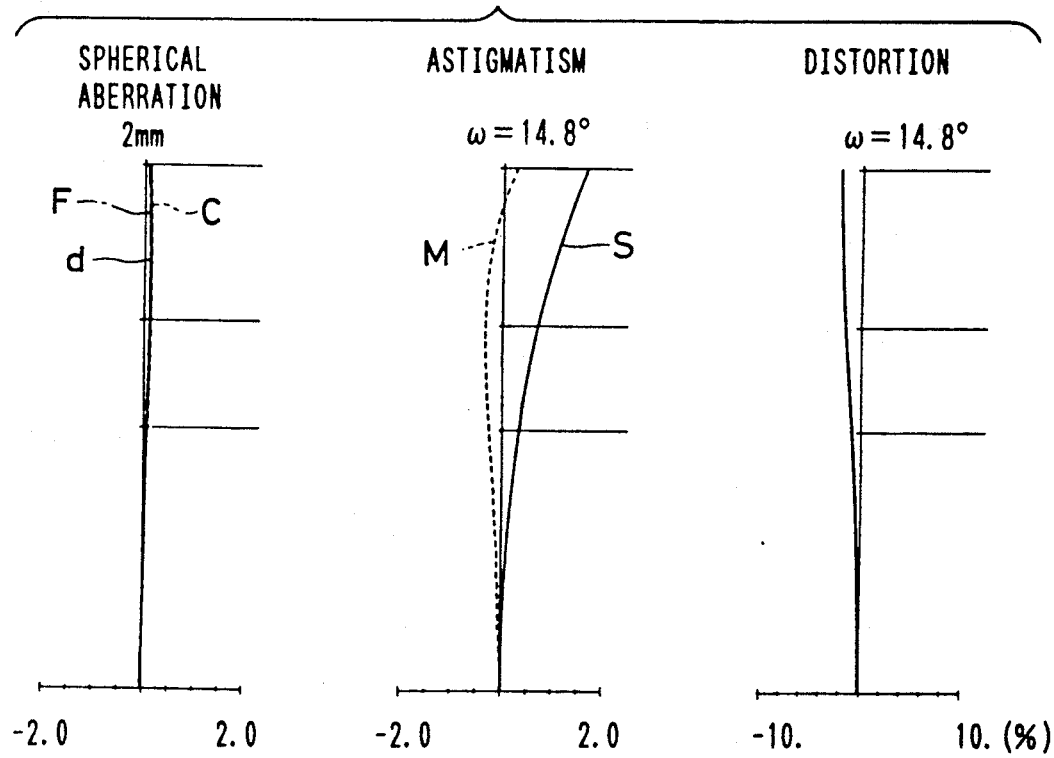
FIG. 34 shows curves illustrating aberration characteristics at the high magnification position of the eighth embodiment.

The eighth embodiment has the same composition as that the fifth embodiment, except for the eyepiece lens unit 7. Speaking concretely, the eyepiece lens unit 7 is composed of a positive lens component 7a and a single negative lens component 7b, and has positive refractive power as a whole in the eighth embodiment. The eighth embodiment has the compositions illustrated in FIG. 31A, FIG. 31B and FIG. 31C, and the aberration characteristics visualized in FIG. 32, FIG. 33 and FIG. 34 at the low magnification position, middle magnification position and high magnification position thereof respectively.

The eighth embodiment is designed with the following numerical data:

Magnification of the viewfinder = 0.4~1.0,
Field angle of the viewfinder (2ω) = 70.6°~29.5°,
Field angle of emergence of the viewfinder = 28.9°
$|L/f_1| = 2.83, f_2/f_w = 4.10, f_4/f_w = 4.39$ $\gamma_1 = 104.3980$
 $d_1 = 1.000$ $n_1 = 1.58362$ $\nu_1 = 30.37$
$\gamma_2 = 8.6220$ (Aspherical surface)
 $d_2 = 7.655$ (Variable)
$\gamma_3 = 8.0187$ (Aspherical surface)
 $d_3 = 1.500$ $n_2 = 1.49260$ $\nu_2 = 58.02$
$\gamma_4 = 13.7059$
 $d_4 = 10.605$ (Variable)
$\gamma_5 = 25.5346$ (Aspherical surface)
 $d_5 = 3.000$ $n_3 = 1.49260$ $\nu_3 = 58.02$
$\gamma_6 = -13.0422$
 $d_6 = 1.034$ (Variable)
$\gamma_7 = 19.0289$
 $d_7 = 21.000$ $n_4 = 1.49260$ $\nu_4 = 58.02$
$\gamma_8 = \infty$
 $d_8 = 1.079$
$\gamma_9 = 23.7340$
 $d_9 = 30.440$ $n_5 = 1.49260$ $\nu_5 = 58.02$
$\gamma_{10} = \infty$
 $d_{10} = 1.762$
$\gamma_{11} = 13.3854$ (Aspherical surface)
 $d_{11} = 5.550$ $n_6 = 1.49260$ $\nu_6 = 58.02$
$\gamma_{12} = -19.4165$
 $d_{12} = 1.000$
$\gamma_{13} = 27.9399$
 $d_{13} = 1.500$ $n_7 = 1.58362$ $\nu_7 = 30.37$
$\gamma_{14} = 13.6658$
 $d_{14} = 15.000$
$\gamma_{15}$ (Pupil)

Aspherical coefficient

Second surface
 $E = -0.19069 \times 10^{-3}$, $F = -0.57234 \times 10^{-5}$
Third surface
 $E = -0.19088 \times 10^{-3}$, $F = -0.62144 \times 10^{-5}$
Fifth surface
 $E = -0.80200 \times 10^{-4}$, $F = -0.29899 \times 10^{-5}$
Twelfth surface
 $E = -0.14482 \times 10^{-3}$, $F = -0.37105 \times 10^{-8}$ Data of zooming

| | Low | Middle | High |
|---|---|---|---|

-continued

Magnification of the viewfinder = 0.4~1.0,
Field angle of the viewfinder (2ω) = 70.6°~29.5°,
Field angle of emergence of the viewfinder = 28.9°
$|L/f_1| = 2.83$, $f_2/f_w = 4.10$, $f_4/f_w = 4.39$

|  | magnification | magnification | magnification |
|---|---|---|---|
| $d_2$ | 7.6548 | 1.4072 | 1.0336 |
| $d_4$ | 10.6053 | 9.2520 | 1.2403 |
| $d_6$ | 1.0336 | 8.6345 | 17.0198 |

| Condition (6) | −1.18 |
|---|---|
| Condition (7) | 0.262 |
| Condition (8) | 0.301 |

Ninth embodiment

Figure 35:
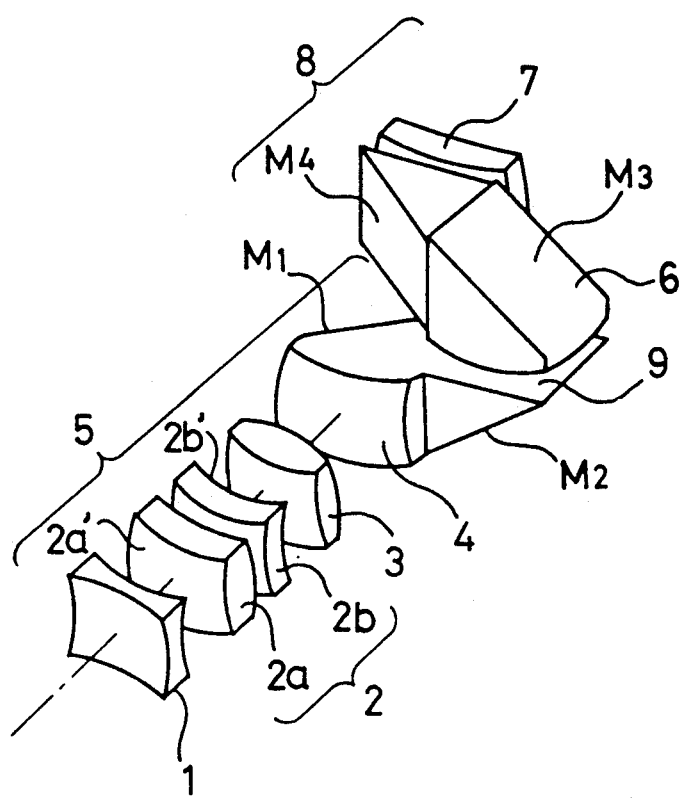
FIG. 35 is a perspective view illustrating a ninth embodiment of the viewfinder optical system according to the present invention.

The ninth embodiment has the composition shown in FIG. 35. That is to say, the ninth embodiment uses an objective lens system 5 which comprises a first stationary lens unit 1 composed of a negative lens component, a second movable lens unit 2 which is composed of a positive lens component 2a and a negative lens component 2b, and has positive refractive power as a whole, a third movable lens unit 3 having positive refractive power and fourth lens unit 4 consisting of a prism having a first reflecting surface $M_1$ and a second reflecting surface $M_2$ for erecting an image and having positive refractive power. The second lens unit 2 has an object side surface 2a' and an image side surface 2b' both of which are convex toward the object side. Further, a visual field frame 9 on which an intermediate image is to be formed by the objective lens system 5 is arranged on a surface of emergence of the fourth lens unit 4. The reference numeral 6 designates a prism which has a third reflecting surface $M_3$ and a fourth reflecting surface, $M_4$ and composes an image erecting system along with the reflecting surfaces $M_1$ and $M_2$ of the fourth lens unit 4. The reference numeral 7 used in FIG. 35 represents an eyepiece lens arranged after a surface of emergence of the prism 6 and composing an eyepiece lens unit 8 along with the prism 6.

Figure 36A:
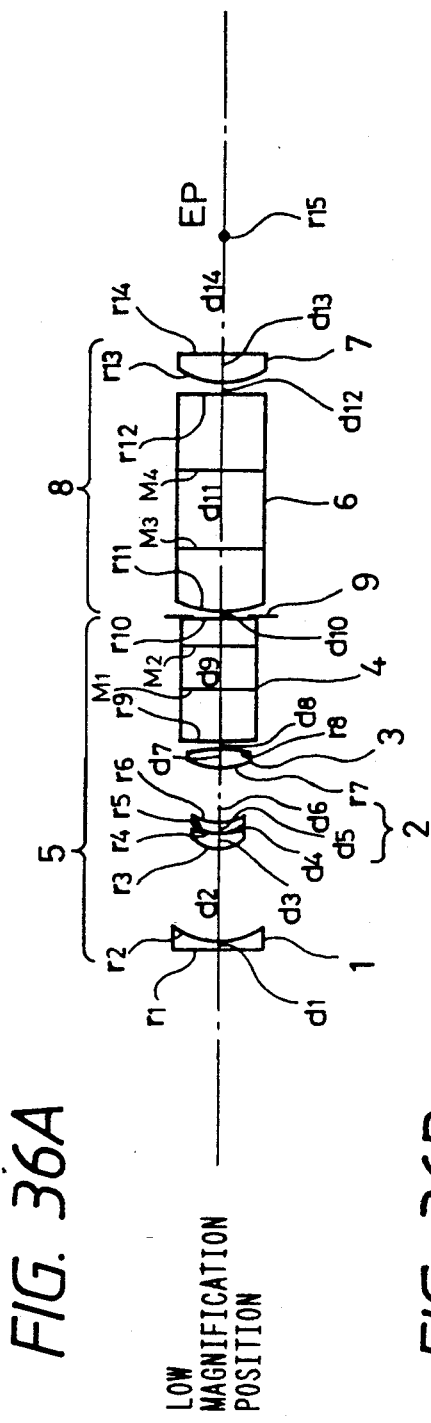
FIG. 36A, FIG. 36B and FIG. 36C are expansion plans illustrating a low magnification position, a middle magnification position and a high magnification position of the ninth embodiment shown in FIG. 35.
Figure 36B:
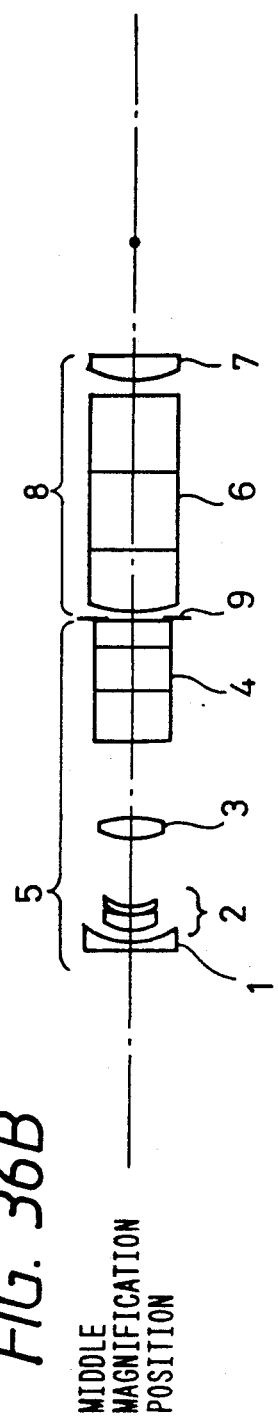
Figure 36C:
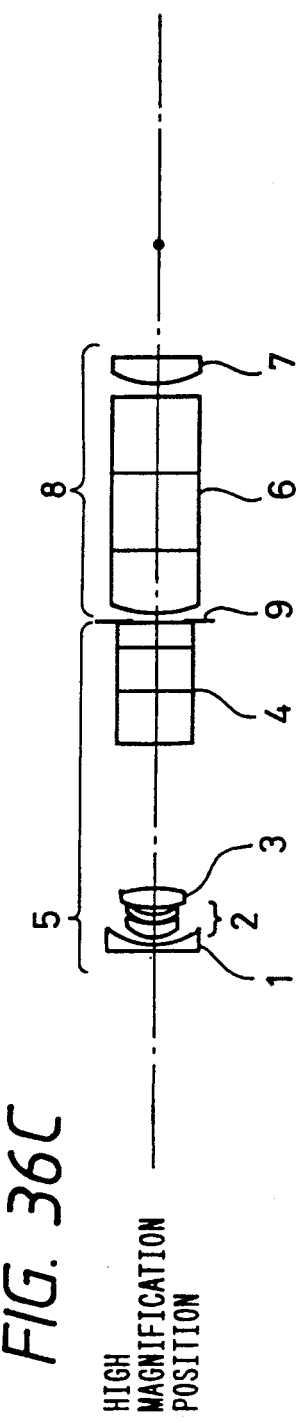
Figure 37:
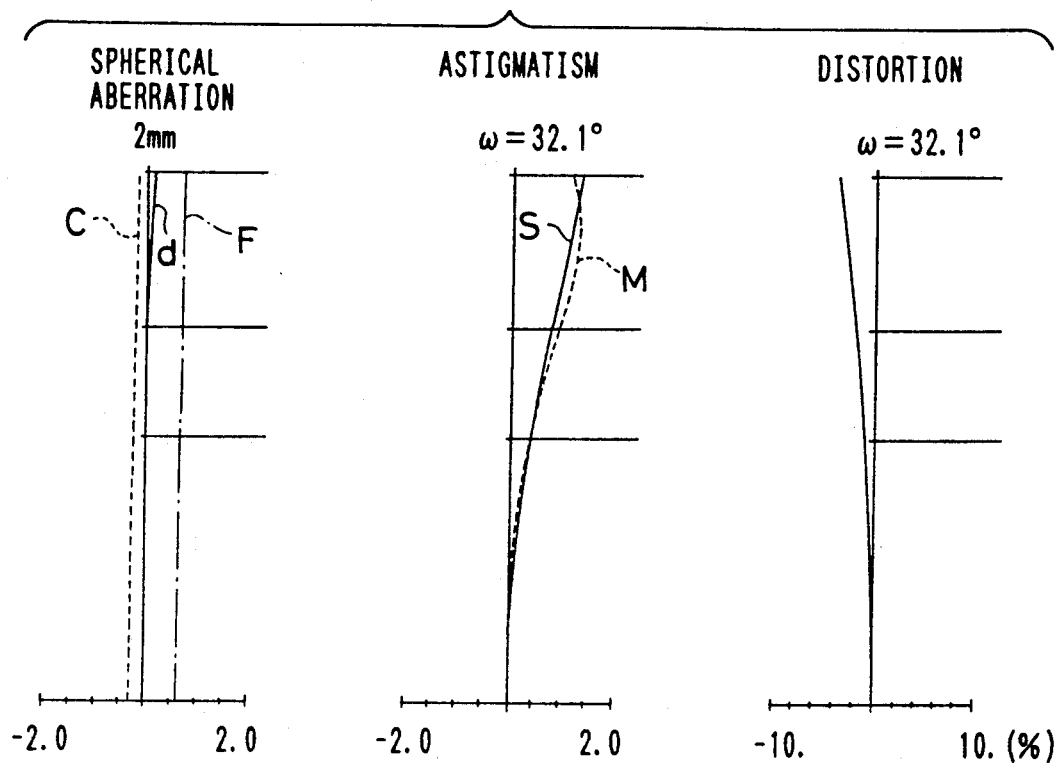
FIG. 37 shows graphs illustrating spherical aberration, astigmatism and distortion respectively at the low magnification position of the ninth embodiment.
Figure 38:
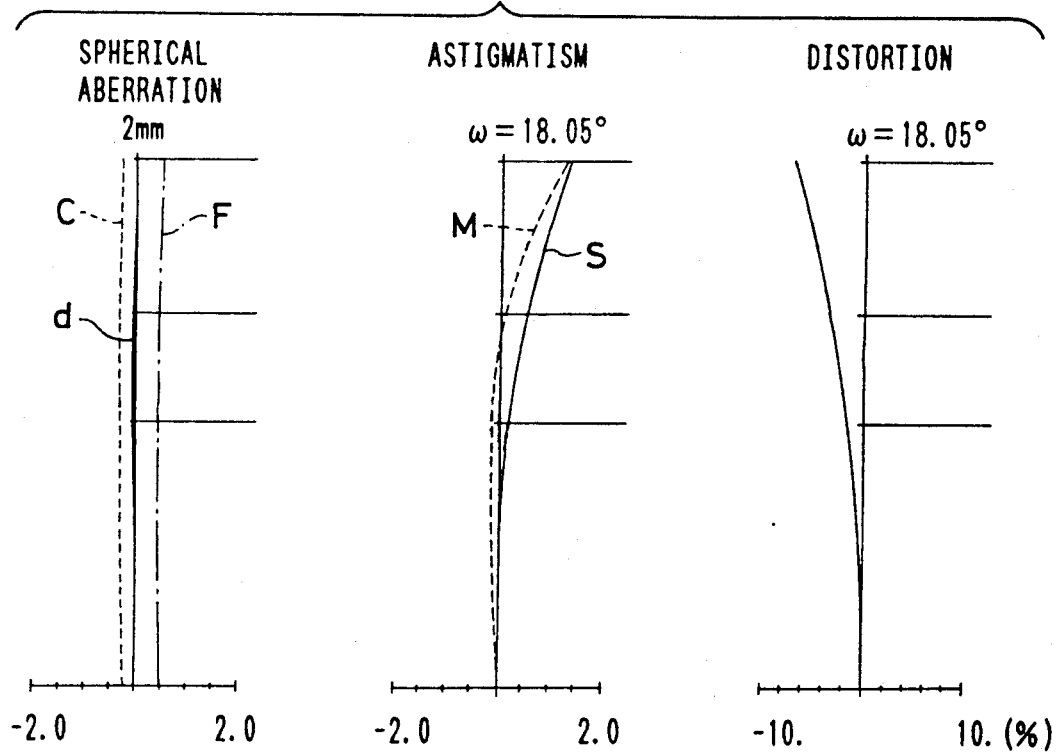
FIG. 38 shows curves visualizing spherical aberration, astigmatism and distortion respectively at the middle magnification position of the ninth embodiment.
Figure 39:
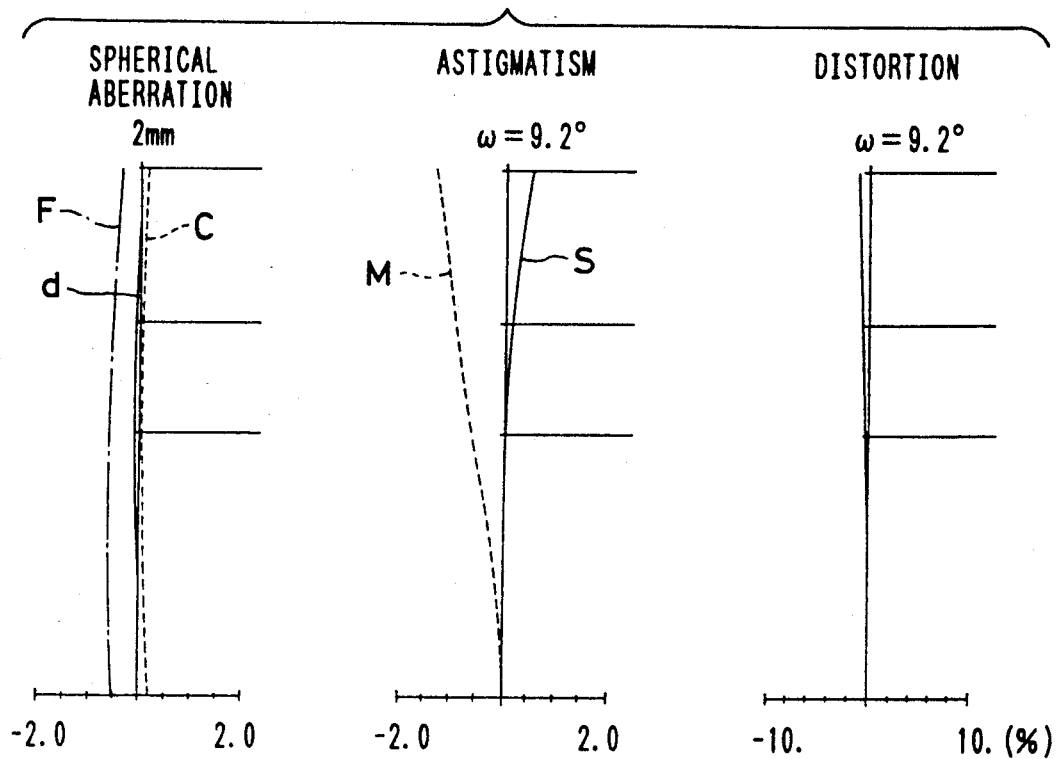
FIG. 39 shows curves visualizing spherical aberration, astigmatism and distortion at the high magnification position of the ninth embodiment.

The ninth embodiment has the compositions illustrated in FIG. 36A, FIG. 36B and FIG. 36C, and spherical aberration, astigmatism and distortion visualized in FIG. 37, FIG. 38 and FIG. 39 at the low magnification position, middle magnification position and high magnification position thereof respectively.

The ninth embodiment is designed with the numerical data listed below:

Magnification of the viewfinder = 0.35~1.31,
Field angle of the viewfinder (2ω) = 64.2°~18.5°

$\gamma_1 = -233.8927$
   $d_1 = 1.028$   $n_1 = 1.58362$   $\nu_1 = 30.37$
$\gamma_2 = 7.6021$ (Aspherical surface)
   $d_2$ (Variable)
$\gamma_3 = 5.3824$ (Aspherical surface)
   $d_3 = 2.100$   $n_2 = 1.49260$   $\nu_2 = 58.02$
$\gamma_4 = 10.5496$
   $d_4 = 0.266$
$\gamma_5 = 7.5158$
   $d_5 = 1.000$   $n_3 = 1.58362$   $\nu_3 = 30.37$
$\gamma_6 = 6.3475$
   $d_6$ (Variable)
$\gamma_7 = 10.2497$ (Aspherical surface)
   $d_7 = 2.687$   $n_4 = 1.49260$   $\nu_4 = 58.02$
$\gamma_8 = -21.0421$
   $d_8$ (Variable)
$\gamma_9 = 56.7539$
   $d_9 = 16.523$   $n_5 = 1.49260$   $\nu_5 = 58.02$
$\gamma_{10} = \infty$ -continued Magnification of the viewfinder = 0.35~1.31,
Field angle of the viewfinder (2ω) = 64.2°~18.5°

$d_{10} = 1.0000$
$\gamma_{11} = 15.5302$
   $d_{11} = 28.862$   $n_6 = 1.49260$   $\nu_6 = 58.02$
$\gamma_{12} = \infty$
   $d_{12} = 1.469$
$\gamma_{13} = 9.9141$ (Aspherical surface)
   $d_{13} = 3.539$   $n_7 = 1.49260$   $\nu_7 = 58.02$
$\gamma_{14} = 111.0584$
   $d_{14} = 15.000$
$\gamma_{15}$ (Eye Point)

Aspherical coefficient

Second surface
   $E = -0.60372 \times 10^{-3}$,   $F = -0.34425 \times 10^{-5}$,
   $G = 0.48191 \times 10^{-8}$
Third surface
   $E = -0.90093 \times 10^{-3}$,   $F = -0.14004 \times 10^{-4}$,
   $G = -0.28893 \times 10^{-6}$
Seventh surface
   $E = -0.33538 \times 10^{-3}$,   $F = 0.76939 \times 10^{-5}$,
   $G = -0.32480 \times 10^{-6}$
Fourteenth surface
   $E = -0.16996 \times 10^{-3}$,   $F = 0.65951 \times 10^{-6}$,
   $G = -0.34414 \times 10^{-7}$ Data of zooming

|  | Low magnification | Middle magnification | High magnification |
|---|---|---|---|
| $d_2$ | 12.8407 | 1.6946 | 1.0000 |
| $d_6$ | 7.3705 | 9.2035 | 0.5328 |
| $d_8$ | 0.8218 | 10.1349 | 19.5001 |

| Condition (6) | −0.937 |
|---|---|
| Condition (7) | 0.082 |
| Condition (8) | 0.235 |

Tenth embodiment

Figure 41:
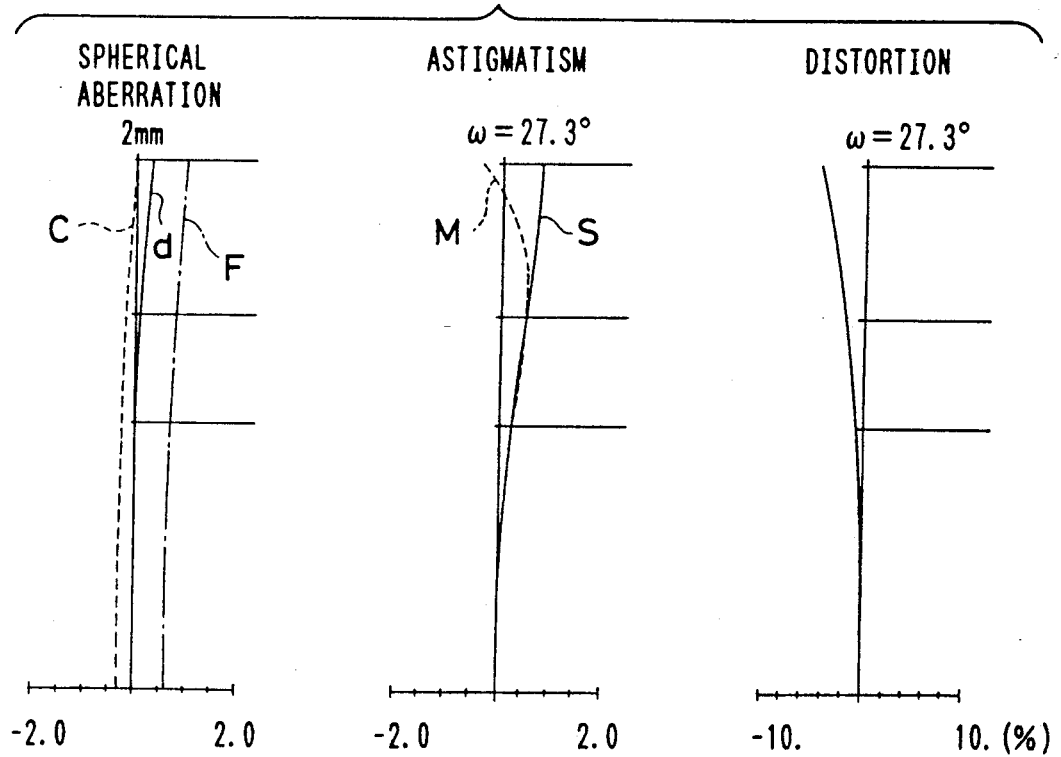
FIG. 41 shows graphs illustrating spherical aberration, astigmatism and distortion at the low magnification position of the tenth embodiment.
Figure 42:
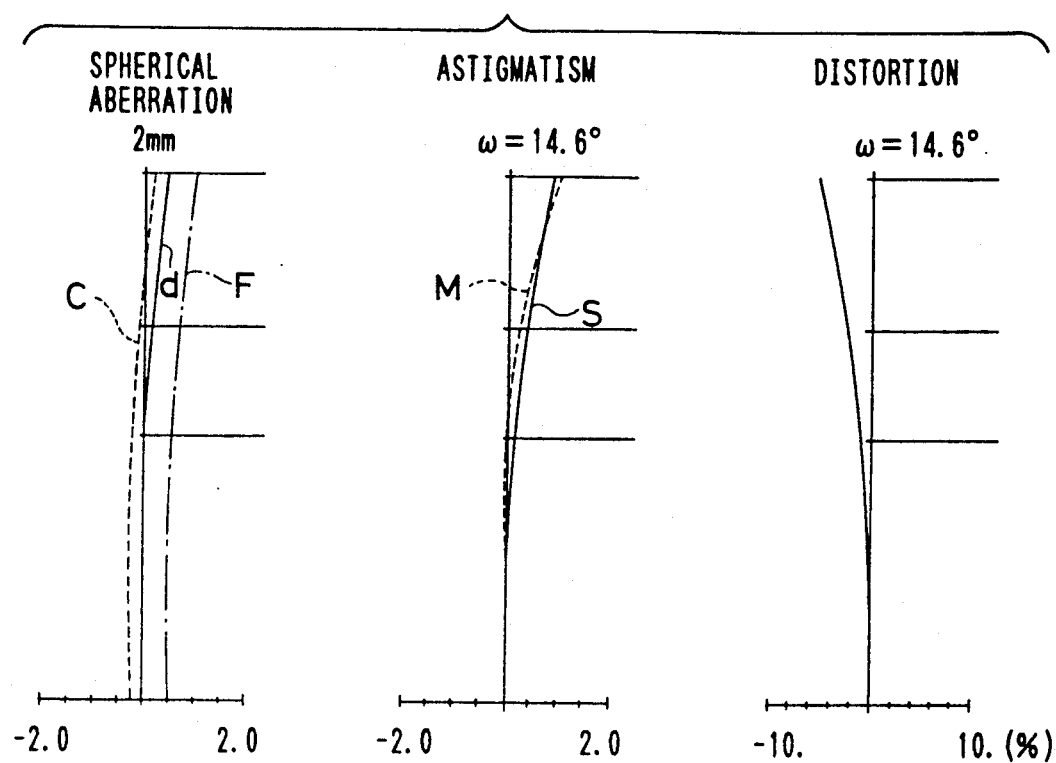
FIG. 42 shows graphs illustrating spherical aberration, astigmatism and distortion at the middle magnification position of the tenth embodiment.
Figure 43:
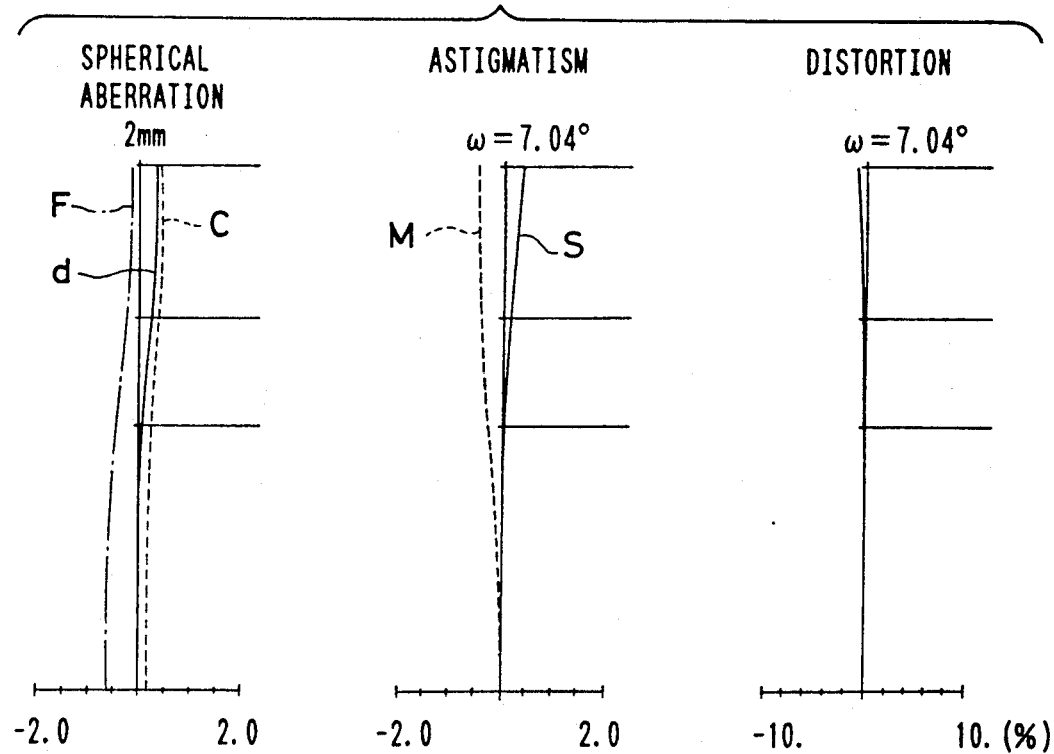
FIG. 43 shows curves visualizing spherical aberration, astigmatism and distortion at the high magnification position of the tenth embodiment.

The tenth embodiment has a composition which is substantially the same as that of the ninth embodiment. The tenth embodiment has the compositions shown in FIG. 40A, FIG. 40B and 40C, and the aberration characteristics illustrated in FIG. 41, FIG. 42 and FIG. 43 at the low magnification position, middle magnification position and high magnification position thereof respectively.

Numerical data for the tenth embodiment is listed below:

Magnification of the viewfinder = 0.33~1.33,
Field angle of the viewfinder (2ω) = 54.6°~14.1°

$\gamma_1 = -252.7357$
   $d_1 = 1.028$   $n_1 = 1.58362$   $\nu_1 = 30.37$
$\gamma_2 = 7.6102$ (Aspherical surface)
   $d_2$ (Variable)
$\gamma_3 = 5.3054$ (Aspherical surface)
   $d_3 = 2.100$   $n_2 = 1.49260$   $\nu_2 = 58.02$
$\gamma_4 = 10.7043$
   $d_4 = 0.226$
$\gamma_5 = 7.6077$
   $d_5 = 1.000$   $n_3 = 1.58362$   $\nu_3 = 30.37$
$\gamma_6 = 6.2686$
   $d_6$ (Variable)
$\gamma_7 = 10.1823$ (Aspherical surface)
   $d_7 = 2.687$   $n_4 = 1.49260$   $\nu_4 = 58.02$
$\gamma_8 = -23.2390$
   $d_8$ (Variable)
$\gamma_9 = 56.7539$
   $d_9 = 16.523$   $n_5 = 1.49260$   $\nu_5 = 58.02$
$\gamma_{10} = \infty$ -continued Magnification of the viewfinder = 0.33~1.33,
Field angle of the viewfinder (2ω) = 54.6°~14.1°

$r_{11} = 15.7130$
$\quad d_{10} = 1.000$
$\quad d_{11} = 28.862 \quad n_6 = 1.49260 \quad \nu_6 = 58.02$
$r_{12} = \infty$
$\quad d_{12} = 1.469$
$r_{13} = 9.8776$ (Aspherical surface)
$\quad d_{13} = 3.539 \quad n_7 = 1.49260 \quad \nu_7 = 58.02$
$r_{14} = 106.6582$
$\quad d_{14} = 15.000$
$r_{15}$ (Eye Point)

Aspherical coefficient

Second surface
$\quad E = -0.50783 \times 10^{-3}, \quad F = -0.14411 \times 10^{-5},$
$\quad G = 0.74277 \times 10^{-7}$
Third surface
$\quad E = -0.89026 \times 10^{-3}, \quad F = -0.12928 \times 10^{-4},$
$\quad G = -0.21823 \times 10^{-8}$
Seventh surface
$\quad E = -0.25178 \times 10^{-3}, \quad F = 0.87013 \times 10^{-5},$
$\quad G = -0.10582 \times 10^{-5}$
Fourteenth surface
$\quad E = -0.16611 \times 10^{-3}, \quad F = 0.13393 \times 10^{-5},$
$\quad G = -0.64768 \times 10^{-7}$ Data of zooming

|   | Low magnification | Middle magnification | High magnification |
|---|---|---|---|
| $d_2$ | 14.4713 | 2.2150 | 1.0000 |
| $d_6$ | 7.5191 | 10.4973 | 1.0000 |
| $d_8$ | 0.3956 | 9.6737 | 20.3860 |

| Condition (6) | −0.942 |
| Condition (7) | 0.083 |
| Condition (8) | 0.238 |

Eleventh embodiment

In the eleventh embodiment, an image erecting system is composed of a fourth lens unit 4 having a first reflecting surface $M_1$, and a relay optical system 10 which has a second reflecting surface $M_2$, a third reflecting surface $M_3$ and a fourth reflecting surface $M_4$. An intermediate image surface is located between the fourth lens unit 4 and the relay optical system 10, and another intermediate image surface is located between the relay optical system 10 and an eyepiece lens unit 7.

Figure 45:
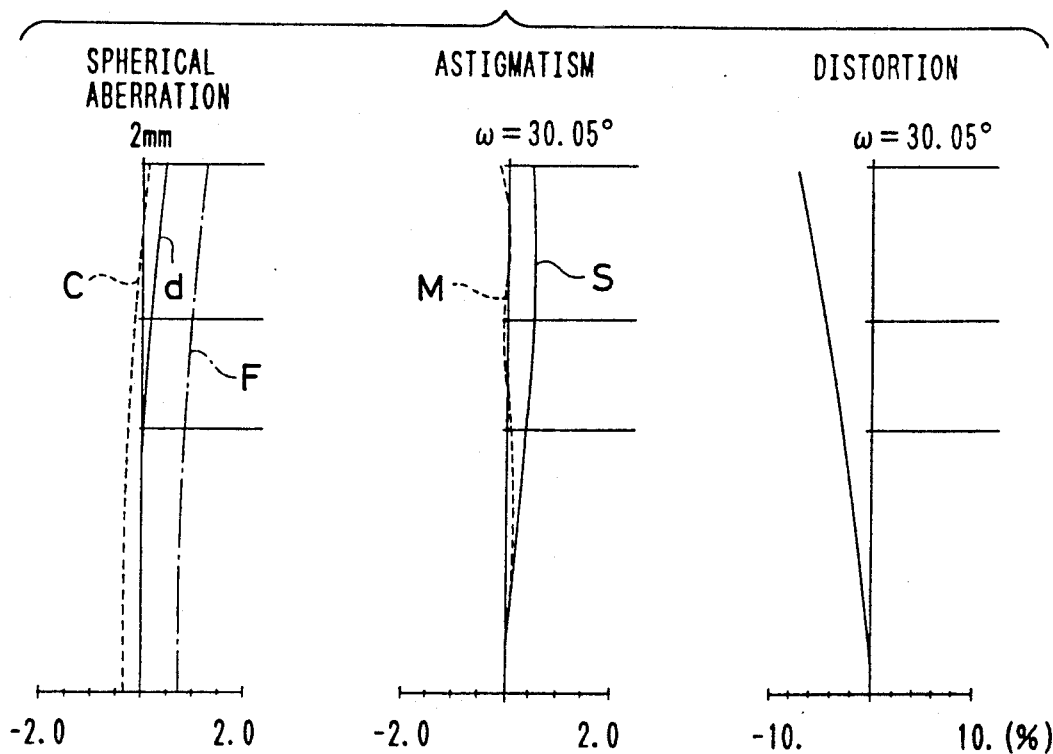
FIG. 45 shows curves visualizing spherical aberration, astigmatism and distortion at the low magnification position of the eleventh embodiment.
Figure 46:
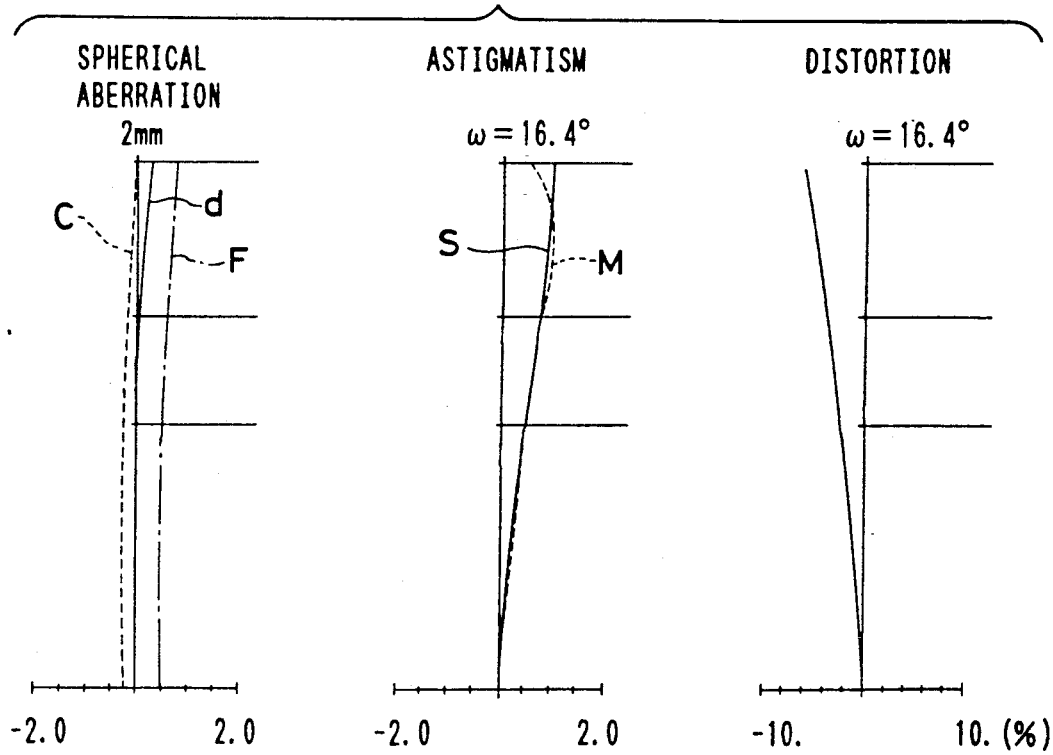
FIG. 46 shows curves visualizing spherical aberration, astigmatism and distortion at the middle magnification position of the eleventh embodiment.
Figure 47:
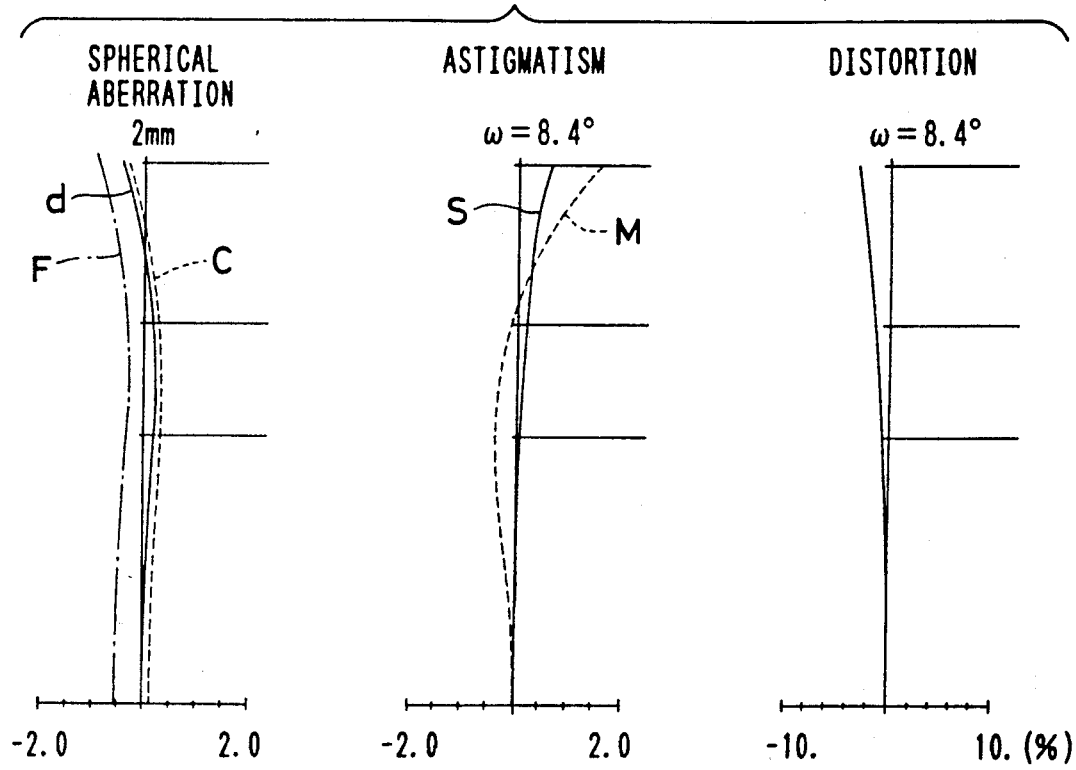
FIG. 47 shows curves visualizing spherical aberration, astigmatism and distortion at the high magnification position of the eleventh embodiment.

FIG. 44A, FIG. 44B and FIG. 44C show compositions of the eleventh embodiment at the low magnification position, middle magnification position and high magnification position respectively, and FIG. 45 through FIG. 47 illustrate aberration characteristics at the low magnification position, middle magnification position and high magnification position respectively of the eleventh embodiment.

The eleventh embodiment has the numerical data listed below:

Magnification of the viewfinder = 0.35~1.31,
Field angle of the viewfinder (2 ω) = 60.1°~16.8°

$r_1 = -44.3975$
$\quad d_1 = 1.000 \quad n_1 = 1.58362 \quad \nu_1 = 30.37$
$r_2 = 16.2878$ (Aspherical surface)
$\quad d_2$ (Variable)
$r_3 = 5.8117$ (Aspherical surface)
$\quad d_3 = 3.300 \quad n_2 = 1.49241 \quad \nu_2 = 57.66$
$r_4 = -95.7654$
$\quad d_4 = 0.300$
$r_5 = 13.5066$ -continued Magnification of the viewfinder = 0.35~1.31,
Field angle of the viewfinder (2 ω) = 60.1°~16.8°

$\quad d_5 = 1.505 \quad n_3 = 1.58362 \quad \nu_3 = 30.37$
$r_6 = 5.2183$
$\quad d_6$ (Variable)
$r_7 = 11.5788$ (Aspherical surface)
$\quad d_7 = 1.907 \quad n_4 = 1.49241 \quad \nu_4 = 57.66$
$r_8 = 159.4279$
$\quad d_8$ (Variable)
$r_9 = 12.2271$
$\quad d_9 = 9.019 \quad n_5 = 1.49241 \quad \nu_5 = 57.66$
$r_{10} = 68.4590$
$\quad d_{10} = 1.500$
$r_{11} = 146.3630$
$\quad d_{11} = 27.227 \quad n_6 = 1.49241 \quad \nu_6 = 57.66$
$r_{12} = -30.9370$
$\quad d_{12} = 0.300$
$r_{13} = 8.2425$ (Aspherical surface)
$\quad d_{13} = 5.000 \quad n_7 = 1.49241 \quad \nu_7 = 57.66$
$r_{14} = -38.6987$
$\quad d_{14} = 0.109$
$r_{15} = 5.4707$
$\quad d_{15} = 3.741 \quad n_8 = 1.49241 \quad \nu_8 = 57.66$
$r_{16} = 11.2327$
$\quad d_{16} = 0.888$
$r_{17} = -28.4658$
$\quad d_{17} = 1.500 \quad n_9 = 1.80518 \quad \nu_9 = 25.43$
$r_{18} = 3.0718$
$\quad d_{18} = 1.000$
$r_{19} = 10.9769$
$\quad d_{19} = 8.889 \quad n_{10} = 1.49241 \quad \nu_{10} = 57.66$
$r_{20} = -4.9000$
$\quad d_{20} = 14.294$
$r_{21} = 9.8636$
$\quad d_{21} = 3.800 \quad n_{11} = 1.49241 \quad \nu_{11} = 57.66$
$r_{22} = -309.2520$
$\quad d_{22} = 20.501$
$r_{23} = -28.5841$
$\quad d_{23} = 2.900 \quad n_{12} = 1.49241 \quad \nu_{12} = 57.66$
$r_{24} = -8.4475$
$\quad d_{24} = 15.000$
$r_{25}$ (Eye point)

Aspherical coefficient

Second surface
$\quad E = -0.16562 \times 10^{-3}, \quad F = -0.27842 \times 10^{-5},$
$\quad G = 0.19045 \times 10^{-6}, \quad H = -0.35490 \times 10^{-8}$
Third surface
$\quad E = -0.67756 \times 10^{-3}, \quad F = 0.57243 \times 10^{-5},$
$\quad G = -0.73587 \times 10^{-6}, \quad H = -0.26009 \times 10^{-8}$
Seventh surface
$\quad E = 0.20717 \times 10^{-3}, \quad F = -0.62740 \times 10^{-4},$
$\quad G = 0.30001 \times 10^{-5}, \quad H = -0.30416 \times 10^{-7}$
Fourteenth surface
$\quad E = -0.34821 \times 10^{-3}, \quad F = 0.30552 \times 10^{-5},$
$\quad G = -0.84034 \times 10^{-7}, \quad H = -0.28550 \times 10^{-9}$ Data of zooming

|   | Low magnification | Middle magnification | High magnification |
|---|---|---|---|
| $d_2$ | 21.2657 | 8.6662 | 1.5000 |
| $d_6$ | 1.5000 | 7.9107 | 1.4994 |
| $d_8$ | 3.3861 | 9.5749 | 23.1524 |

| Condition (6) | −0.463 |
| Condition (7) | −0.054 |
| Condition (8) | 0.379 |

In the numerical data listed above, the reference symbols $r_1, r_2, \ldots$ represent radii of curvature on the respective lens surface, the reference symbols $d_1, d_2, \ldots$ designate thickness of the respective lens components and airspaces reserved therebetween, the reference symbols $n_1, n_2, \ldots$ denote refractive indices of the respective lens components, and the reference symbols $\nu_1$, $\nu_2, \ldots$ represent Abbe's numbers of the respective lens components.

Further, shapes of the aspherical surfaces used in the embodiments are expressed by the following formula:

$$X = [(CS^2)/(1 + \sqrt{1 - P C^2 S^2})] + ES^4 + FS^6 + GS^8 + HS^{10}$$

wherein the direction of the optical axis is taken as X, the direction perpendicular to the optical axis is taken as S, the reference symbol C represents curvature ($=1/\gamma$) on a vertex of an aspherical surface, and the reference symbols E, F, G, and H designate the aspherical surface coefficients.

Furthermore, the optical members of the objective lens systems used in the embodiments described above may be made of glass materials so far as these materials are payable through the embodiments are described on an assumption that the optical members are to be made of plastic materials.

In the drawings illustrating the aberration characteristics of the Embodiments of the present invention, the pupil radius at the eye point is taken as the ordinate for spherical aberration, emerging angle from the eyepiece lens system is taken as the ordinate for astigmatism and distortion, and diopter is taken as the abscissa for spherical aberration and astigmatism.

What is claimed is:

1. A real image type variable magnification viewfinder optical system comprising, in order from the object side:
    an objective lens system comprising a first lens unit having negative refractive power, a second lens unit having positive refractive power, a third lens unit having positive refractive power, and a fourth lens unit comprising at least one reflecting surface and having positive refractive power as a whole;
    a visual field frame arranged on an intermediate image surface on which an intermediate image is to be formed by said objective lens system, and
    an eyepiece lens system having positive refractive power as a whole;
    said first lens unit and said fourth lens unit being stationary, and said second lens unit and said third lens unit being moved along the optical axis to perform variation of magnification and adjustment of diopter.

2. A real image type variable magnification viewfinder optical system comprising, in order from the object side:
    an objective lens system comprising a first lens unit having negative refractive power, a second lens unit having positive refractive power, a third lens unit having positive refractive power, and a fourth lens unit comprising at least one reflecting surface and having positive refractive power as a whole;
    a visual field frame arranged on an intermediate image surface on which an intermediate image is to be formed by said objective lens system, and
    an eyepiece lens system comprising a reflecting member for inverting said intermediate image and having positive refractive power as a whole;
    said first lens unit and said fourth lens unit being stationary, and said second lens unit and said third lens unit along the optical axis to perform variation of magnification and adjustment of diopter.

3. A real image type variable magnification viewfinder optical system comprising, in order from the object side:
    an objective lens system comprising a first lens unit having negative refractive power, a second lens unit having positive refractive power, a third lens unit having positive refractive power, and a fourth lens unit comprising at least one reflecting surface and having positive refractive power as a whole;
    a visual field frame arranged on an intermediate image surface on which an intermediate image is to be formed by said objective lens system, and
    an eyepiece lens system comprising a reflecting member for inverting said intermediate image and having positive refractive power as a whole;
    at least one of airspaces between said first lens unit through said fourth lens unit being varied to perform variation of magnification and adjustment of diopter.

4. A real image type variable magnification viewfinder optical system according to claim 1, 2 or 3 wherein said fourth lens unit comprises an optical member having two reflecting surfaces.

5. A real image type variable magnification viewfinder optical system according to claim 1, 2 or 3 wherein said intermediate image surface is coincident with a surface of emergence of said fourth lens unit.

6. A real image type variable magnification viewfinder optical system according to claim 1, 2 or 3 wherein said intermediate image surface is coincident with a surface of incidence of said reflecting member.

7. A real image type variable magnification viewfinder optical system according to claim 1 wherein said eyepiece lens system comprises a reflecting member and at least one positive lens component.

8. A real image type variable magnification viewfinder optical system according to claim 1, 2 or 3 wherein an image is inverted in the vertical and horizontal directions by said fourth lens unit and said reflecting member.

9. A real image type variable magnification viewfinder optical system according to claim 1, 2 or 3 wherein said second lens unit has an object side surface and an image side surface both convex toward the object side.

10. A real image type variable magnification viewfinder optical system according to claim 9 wherein said second lens unit comprises a positive lens component and a negative lens component.

11. A real image type variable magnification viewfinder optical system according to claim 1, 2 or 3 wherein said fourth lens unit has a surface of incidence convex toward the object side.

12. A real image type variable magnification viewfinder optical system according to claim 2 or 3 wherein said reflecting member has a surface of incidence convex toward the object side.

13. A real image type variable magnification viewfinder optical system according to claim 1, 2 or 3 satisfying the following condition:

$$1.0 < |L/f_1| < 3.0$$

wherein the reference symbol L represents a distance as measured from a first surface of said objective lens system to said intermediate image surface and the reference symbol $f_1$ designates a focal length of said first lens unit.

14. A real image type variable magnification viewfinder optical system according to claim 1, 2 or 3 satisfying the following condition:

$$1.5 < f_2/f_w$$

wherein the reference symbol $f_2$ represents a focal length of said second lens unit and the reference symbol $f_w$ designates a focal length of said objective lens system as a whole at a low magnification position thereof.

15. A real image type variable magnification viewfinder optical system according to claim 1, 2 or 3 satisfying the following condition:

$$2.0 < f_4 < f_w$$

wherein the reference symbol $f_4$ represents a focal length of said fourth lens unit and the reference symbol $f_w$ designates a focal length of said objective lens system as a whole at a low magnification position thereof.

16. A real image type variable magnification viewfinder optical system according to claim 1, 2 or 3 satisfying the following conditions:

$$-2 < (\gamma_{21} - \gamma_{20})/(\gamma_{21} + \gamma_{20}) < 0.2$$

$$0 < (\gamma_{30} - \gamma_{21})/(\gamma_{30} + \gamma_{21}) < 0.6$$

wherein the reference symbol $\gamma_{21}$ represents a radius of curvature on an image side surface of said second lens unit, the reference symbol $\gamma_{20}$ designates a radius of curvature on an object side surface of said second lens unit and the reference symbol $3_{30}$ denotes a radius of curvature on an object side surface of said third lens unit.

17. A real image type variable magnification viewfinder optical system according to claim 1, 2 or 3 satisfying the following condition:

$$1.5 < f_4/f_w$$

wherein the reference symbol $f_4$ represents a focal length of said fourth lens unit and the reference symbol $f_w$ designates a focal length of said objective lens system as a whole at a low magnification position thereof.

18. A real image type variable magnification viewfinder optical system according to claim 1, 2 or 3 satisfying the following conditions:

$$-2 < (\gamma_{21} - \gamma_{20})/(\gamma_{21} + \gamma_{20}) < 0.5$$

$$0 < (\gamma_{30} - \gamma_{21})/(\gamma_{30} + \gamma_{21}) < 0.7$$

wherein the reference symbol $\gamma_{21}$ represents a radius of curvature on an image side surface of said second lens unit, the reference symbol $\gamma_{20}$ designates a radius of curvature on an object side surface of said second lens unit and the reference symbol $\gamma_{30}$ denotes a radius of curvature on an object side surface of said third lens unit.

19. A real image type variable magnification viewfinder optical system according to claim 1, 2 or 3 satisfying the following condition:

$$-1.5 < [(\gamma_{11} - \gamma_{10})/(\gamma_{11} + \gamma_{10})]^{-1} < -0.2$$

wherein the reference symbol $\gamma_{11}$ represents a radius of curvature on an image side surface of said first lens unit and the reference symbol $\gamma_{10}$ designates a radius of curvature on an object side surface of said first lens unit.

* * * * *